US005795659A

United States Patent [19]

Meelu et al.

[11] Patent Number: 5,795,659

[45] Date of Patent: Aug. 18, 1998

[54] ALUMINIDE-SILICIDE COATINGS COATED PRODUCTS

[75] Inventors: Mehar C. Meelu, Selly Oak; Alan T. Jones, Mickleover, both of United Kingdom; Bruce G. McMordie, Perkasie, Pa.

[73] Assignees: International Inc., Limerick, Pa.; Rolls-Royce, Inc, plc., Derby, England; a part interest

[21] Appl. No.: 240,691

[22] PCT Filed: Sep. 7, 1993

[86] PCT No.: PCT/US93/08413

§ 371 Date: Nov. 4, 1994

§ 102(e) Date: Nov. 4, 1994

[87] PCT Pub. No.: WO94/07004

PCT Pub. Date: Mar. 31, 1994

[30] Foreign Application Priority Data

Sep. 5, 1992 [GB] United Kingdom .................. 9218859

[51] Int. Cl.[6] .............................. B32B 15/00; F01D 5/28

[52] U.S. Cl. .......................... 428/610; 428/652; 428/678; 416/241 R

[58] Field of Search ...................................... 428/629, 641, 428/652, 678, 668, 680, 610, 941; 416/241 R

[56] References Cited

U.S. PATENT DOCUMENTS

| | | | |
|---|---|---|---|
| Re. 26,001 | 4/1966 | Waontell et al. | 428/652 |
| 2,612,442 | 9/1952 | Goetzel | 428/652 |
| 3,220,876 | 11/1965 | Moeller | 428/941 |
| 3,494,748 | 2/1970 | Todd | 428/641 |
| 3,620,693 | 11/1971 | Soma | 428/680 |
| 3,656,919 | 4/1972 | Lucas et al. | 428/680 |
| 3,779,719 | 12/1973 | Clark et al. | 428/652 |
| 3,864,093 | 2/1975 | Wolfina | 428/641 |
| 4,310,574 | 1/1982 | Deadmore et al. | 428/941 |
| 4,326,011 | 4/1982 | Goebel et al. | 428/441 |
| 4,500,364 | 2/1985 | Kutenat | 428/641 |

FOREIGN PATENT DOCUMENTS

| | | | |
|---|---|---|---|
| 1053351 | 6/1965 | United Kingdom | 428/941 |

*Primary Examiner*—John Zimmerman
*Attorney, Agent, or Firm*—Weiser and Associates, P.C.

[57] ABSTRACT

An improved aluminide coating especially for heat resistant superalloy substrates. Slurry coating compositions of eutectic metal alloy powders and of non-eutectic metal powders. A process for coating the substrates and the coated metal parts. The coatings have improved resistance to developing cracks and to hot corrosion and oxidation.

61 Claims, 29 Drawing Sheets

HIGH TEMPERATURE DIFFUSED ALUMINIDE
1300–2100°F (704–1149°C)

SERMALOY J X500

1A6 X400

1A9 X500

9U X491

1A15 X400

4E X400

7E X495

1A4 X400

1A5 X400

1A7 X400

ALUMINIDE-SILICIDE COATINGS COATED PRODUCTS

This application was filed under 35 U.S.C 371 from PCT/US93/08413, filed Sep. 7, 1993.

TECHNICAL FIELD

This invention relates to aluminide coatings for aluminizing of heat resistant alloy substrates, to the slurry coating compositions for the coatings and to a process for applying such coatings, more specifically to composite coatings containing aluminum-rich and silicon-rich phases to improve their resistance to hot corrosion and oxidation.

During operation, components in the turbine section of a gas turbine are exposed to combustion gas temperatures that can reach 1200° C. (2200° F.). These components are typically made of nickel and cobalt base superalloys specially formulated for strength at these temperatures. However, upon exposure to oxygen in the combustion gases at such high temperatures, these heat resistant materials begin to revert to their natural metal oxide form. The nickel and cobalt oxide scales that form on the surfaces of these alloys are not tightly adherent. During thermal cycling, they crack and spall off the surface exposing more unreacted substrate to the environment. in this manner, oxidation roughens and eventually consumes unprotected parts made of these alloys. See FIG. 1. Adding sodium and contaminants containing chlorine and sulphur to the combustion gases speeds degradation. Above about 540° C. (1004° F.), sodium and sulphur react to form low melting point sulphate salts which not only dissolve the oxide films on nickel and cobalt, but also can directly attack the substrates. See FIG. 2.

BACKGROUND ART

One solution to the hot corrosion and oxidation problem which is widely applied in gas turbine engines, is to allow aluminum into the surface of a superalloy component, a process known as aluminizing. Aluminum forms stable intermetallic compounds with both nickel and cobalt. The oxide layer which forms on these compounds at high temperature is no longer a metal oxide of nickel or cobalt, but rather a tough, tightly adherent, protective layer of alumina, $Al_2O_3$. See FIG. 3.

A variety of commercial coatings are based upon this protection scheme. Sometimes aluminum is deposited from a vapor phase in a process that has come to be known as pack aluminizing. In pack aluminizing, aluminum powder is reacted with halide activators to form gaseous compounds which condense on the metal surface and react producing aluminum metal. The aluminum atoms diffuse into the substrate, reacting to produce intermetallic aluminides. This process has been described in detail in a number of patents, including U.S. Pat. No. 3,257,230 (Wochtell et al). This patent is incorporated herein by reference.

State-of-the-art MCrAlY overlay coatings also rely upon alumina films for their hot corrosion resistance. Owing to the presence of chromium and yttrium in the film, aluminum contents in these coatings do not need to be as high as in pack aluminides; however, protection is still derived from a tightly adherent scale of alumina.

Slurry aluminizing is another alternative method of providing a protective, alumina forming intermetallic aluminide coating on a superalloy. In the slurry process, an aluminum-filled slurry coating is first deposited on the hardware. When the coated part is heated in a protective atmosphere, aluminum in the film melts and reacts with the substrate to form the desired intermetallic phases.

The demonstrable resistance of aluminide coatings to hot corrosion and oxidation is due to the thermodynamic stability of the alumina scale that forms on them. However, they do have some susceptibility to "low temperature" hot corrosion attack at about 700°–800° C. by alkali metal oxides (e.g. $Na_2O$) and acidic oxides of refractory metals (e.g. $MoO_3$ and $W_2O_3$).

Silicon dioxide ($SiO_2$) is another very stable oxide. Like aluminum, silicon forms stable intermetallic compounds (silicides) with nickel and cobalt as well as chromium and other elements typically found in refractory alloys, such as molybdenum, tungsten and titanium. This reduces the segregation of these elements into the outer surface protective oxide layer, thus improving its protectiveness. Furthermore, unlike aluminum, silicon is unable to form sulphides and is resistant to sulphur diffusion. Consequently, silicide coatings, produced by pack or slurry processes, have been used on refractory alloys to improve resistance to hot corrosion and oxidation. Silicides have proven particularly useful in resisting sulphurous attack at "low" temperatures (700°–800° C.). The benefits of silicon-based coatings have been described by many, including F. Fitzer and J. Schlicting in their paper "Coatings Containing Chromium, Aluminum and Silicon for High Temperature Alloys", given at a meeting of the National Association of Corrosion Engineers held Mar. 2–6, 1981 in San Diego, Calif., and published by them as pages 604–614 of "High Temperature Corrosion", (Ed. Robert A. Rapp). This paper is incorporated herein by reference.

For the avoidance of doubt, silicon is classed as a metallic element for the purposes of this specification.

The benefits of aluminizing and siliconizing are combined in processes which simultaneously deposit both aluminum and silicon on a metal surface, usually that of a superalloy. One such process, described in U.S. Pat. No. 4,310,574 (Deadmore et al), which is incorporated herein by reference deposits a silicon-filled organic slurry on a surface, then aluminizes the surface by a conventional pack aluminizing. Aluminum carries silicon from the slurry with it as it diffuses into the superalloy from the pack mixture. Deadmore et al ('574) demonstrates that the resultant silicon-enriched aluminide has better resistance to oxidation at 1093° C. than did aluminides without silicon.

Another means to produce so-called "silicon-modified" or "silicon-enriched" aluminides is to apply a slurry coating containing powdered aluminum and silicon metal to an alloy substrate containing aluminide and silicide forming elements and then heat it above 760° C. (1500° F.). As the aluminum and silicon in the slurry melt, they react with the substrate and diffuse preferentially. The aluminum alloys with nickel or cobalt in the substrate while silicon alloys with chromium or other silicide formers. The end result is a composite aluminide-silicide coating. This process is often termed a silicon modified slurry aluminide process and is commercially utilized under the trade name, "SermaLoy J", (a proprietary tradename of Sermatech International, Limerick, Pa., U.S.A.).

Generally speaking, these prior art techniques and coating compositions aim at increasing the silicon in the layer of the coating exposed to the harsh conditions described.

Alloy substrates suited to this form of coating include nickel-based superalloys, cobalt-based superalloys and austenitic stainless steels. It is found that elements corresponding to the constituent elements of the alloy substrate are present throughout the extent of the coating but are combined differentially with the aluminum and silicon constituents of the coating such that the silicon rich phases are differently distributed through the thickness of the coating relative to the aluminum rich phases.

As supplied for use, the SermaLoy J slurry coating composition comprises silicon and aluminum elemental metallic powders in an acidic water solution of inorganic salts as a binder. About 15% by weight of the total metallic powder content of the slurry is silicon powder. However, the overall composition of the slurry in approximate weight percentages is Al powder—35%

Si powder—6%

Water—47%

Binder salts (dissolved in the water)—12%

A preferred mode of preparation of the composition is to premix the metallic powder constituents and make the binder solution separately, then mix the powder into the solution. Other ways of preparing the composition can readily be devised.

This binder is selected to cure to a solid matrix which holds the metal pigments in contact with the metal surface during heating to the diffusion temperature. It also is selected to be fugitive during diffusion to yield residues that are only loosely adherent to the surface after diffusion has been completed.

In tests, the silicon-modified aluminide coating resulting from application of the slurry to superalloy articles and subsequent diffusion heat treatment proved uniquely resistant to sulphidation attack over a wide range of operation temperatures. Details of some testing has been published by American Society of Mechanical Engineers (ASME) in a paper by F. N. Davis and C. E. Grinell entitled "Engine Experience of Turbine Materials and Coatings" (1982) which is incorporated herein by reference. This coating is now specified on many industrial and marine turbines.

The paper reports that SermaLoy J shows good resistance to low and high temperature sulphidation. Because of the very satisfactory properties of the SermaLoy J coating, it is used as one of the standards for comparison in the tests discussed herein.

The theoretical basis for the above improvement is believed to be as follows.

Diffusion heat treatment of an aluminum-silicon slurry coated superalloy or austenitic stainless steel substrate in an inert atmosphere or vacuum causes certain elements from the substrate and the slurry, which have a particular affinity for each other, to diffuse towards, and combine with each other.

At the diffusion temperature, aluminum from the coating and nickel and/or cobalt from the superalloy or stainless steel substrate move rapidly towards each other and combine to form nickel aluminides. Similarly, silicon in the coating has an affinity with the substrate metal chromium, and with molybdenum, tantalum and titanium, if present, and therefore, combines with one or more of these to form their silicides.

However, silicon moves through the coating towards the substrate appreciably more slowly than the aluminum and therefore the outer parts of the coating become relatively enriched with silicon. Because chromium is present in superalloys and austenitic stainless steels in much larger amounts than the other elements for which silicon has an affinity, this silicon mostly combines with chromium during the diffusion treatment to produce an outer coating layer which is richer in chrome silicide than the rest of the coating.

It is convenient for further reference in the description of the invention, to identify several zones in a typical SermaLoy J coating, diffusion heat treated at 870° to 885° C. Inspection of the coating shows a silicon-rich surface zone where chromium silicide is particularly concentrated. This zone transitions to a "layering zone" extending deeper into the coating, comprising alternate layers of silicide and aluminide phases. Beneath the layering zone is an "aluminide zone", where aluminide phases predominate, but also containing silicide precipitates. At the interface with the substrate material, there is a diffusion zone, where the coating and substrate materials have diffused into each other.

The coatings of the invention, as is discussed herein, show a different composition of these layers and/or different thicknesses of the layers.

REFERENCE TO RELATED PATENT APPLICATIONS

This patent application is a continuation-in-part of International patent application PCT/US93/04507, MULTIPLEX ALUMINIDE-SILICIDE COATING, Mehar C. Meelu, Alan T. Jones and Bruce G. McMordie (Meelu et al), filed May 18, 1993, which is based on United Kingdom patent application No. 9210683.0 filed May 19, 1992. The present patent application incorporates PCT/US93/04507 herein by reference. Further comments regarding the international parent application are submitted below.

SUMMARY OF THE INVENTION

An important object of the invention relates to a slurry aluminide coating which is particularly useful for superalloy substrates which in use, are frequently exposed to oxygen in gases at high temperatures. The coating has improved resistance to developing cracks during service while it maintains very satisfactory resistance to oxidation and hot corrosion conditions.

In accordance with the invention, it has been discovered that a coating composition which comprises slurry of a powder of elemental metals typically aluminum and silicon and other metals further described below in a heat-curable binder, gives coatings with unexpected superior properties over coatings of the prior art, including SermaLoy J coatings.

In accordance with the invention, it has also been discovered that a coating which comprises a slurry of an eutectic aluminum-silicon powder in a heat-curable binder gives coatings with unexpected superior properties over the coatings of the prior art, including SermaLoy J coatings.

In accordance with the invention, slurries which depart from an exclusively eutectic slurry are contemplated, as described further below.

In accordance with the invention, certain processing changes have been discovered that are especially well suited to give coatings of improved properties. In particular, it has been found that the process disclosed in the above-referred to International and United States patent applications, is applicable to coat the selected superalloy substrate with the composition s of the invention.

Some more specific aspects of the invention are described hereinafter.

An important aspect of the invention is that aluminide-silicide coatings overall have a more even distribution of their constituents, particularly silicides throughout their thicknesses.

Another aspect of the invention are coatings with reduced over-concentration of silicon content in the surface zone of such coatings, increased depth of the above-mentioned silicon-rich surface zone and of the layering zone, and increased dispersion of silicide phases within the aluminide zone.

The invention is described in greater detail hereinafter.

The term "superalloy" is a term well known in the art. When used herein, it refers to nickel-and cobalt-base alloys suitable as substrates for the coatings of the invention. However, austenitic stainless steels also form suitable substrates for at least some of the coatings of the invention and are considered superalloys for the purpose of the invention.

BRIEF DESCRIPTION OF THE FIGURES

Examples of the invention and of the prior coatings are illustrated with reference to the following Figures, in which.

DETAILED DESCRIPTION OF PREFERRED EMBODIMENTS OF THE INVENTION

Figure 1:
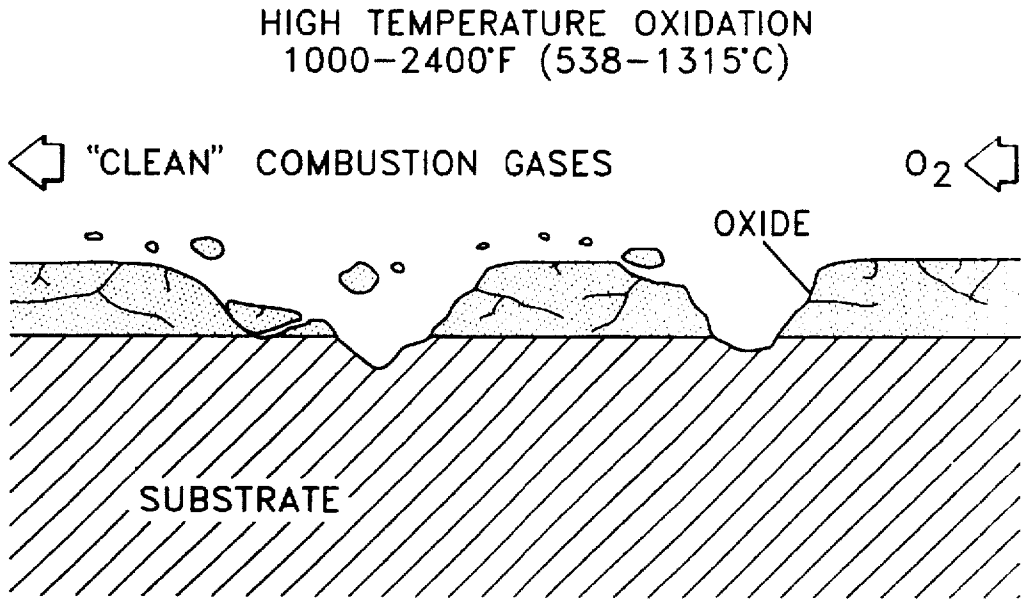
FIG. 1 shows what occurs when a typical substrate of an unprotected superalloy surface is exposed to clean combustion gases.
Figure 2:
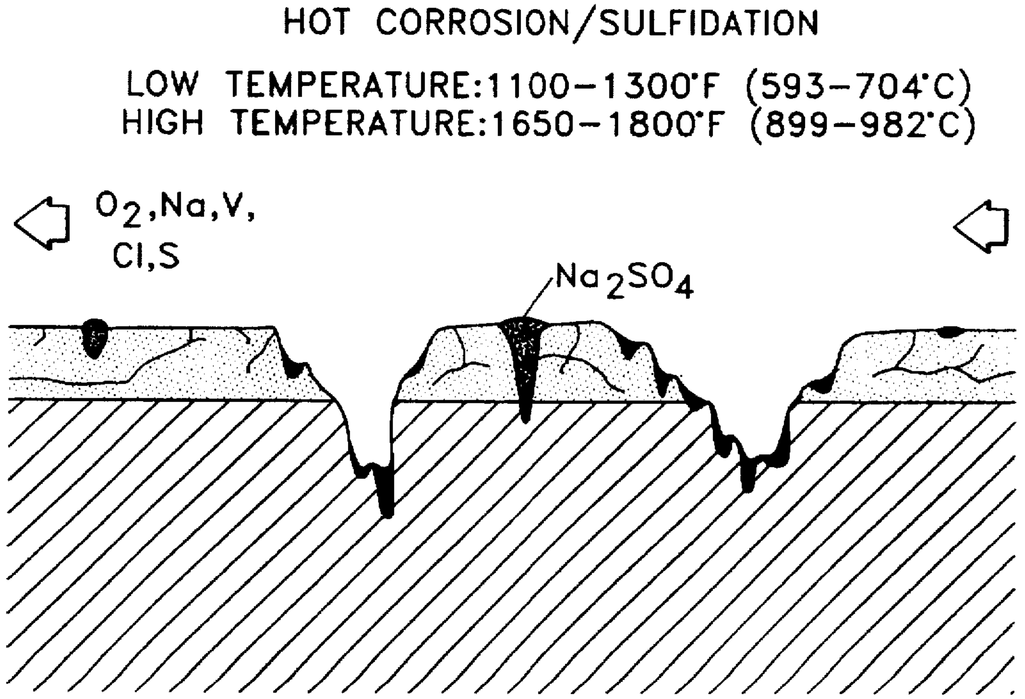
FIG. 2 shows what occurs when a typical substrate of an unprotected superalloy surface is exposed to combustion gases containing contaminants which contain chlorine and sulphur frequently found in marine environments under conditions of hot corrosion/sulphidation.
Figure 3:
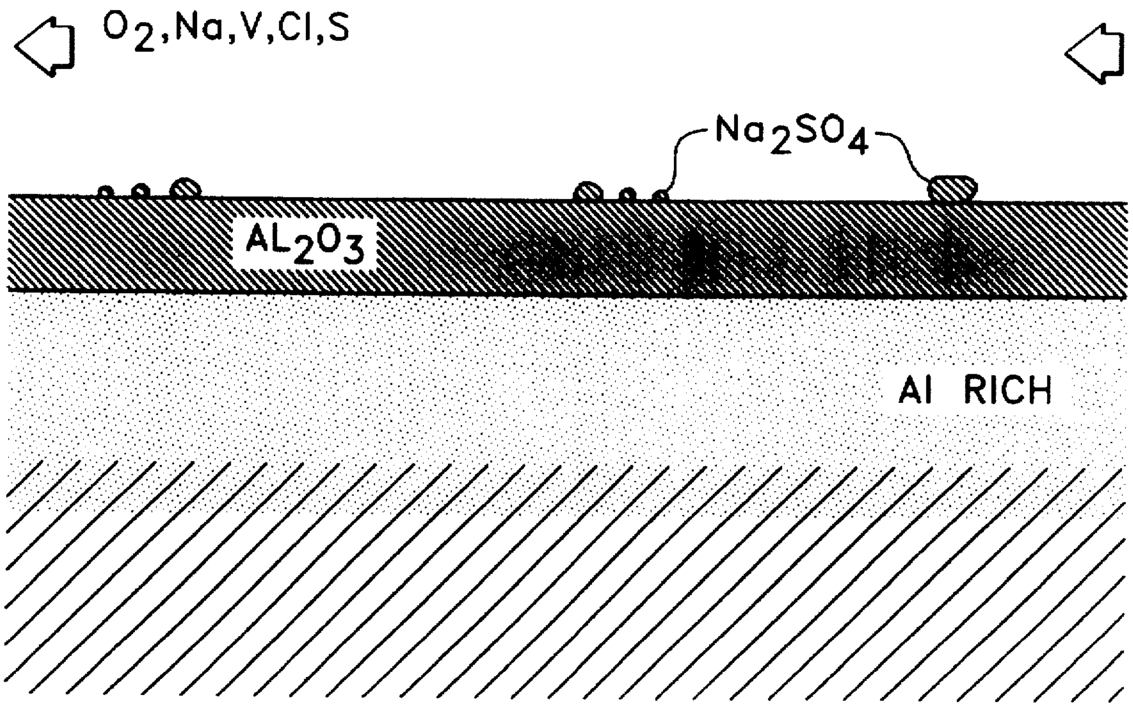
FIG. 3 shows a typical superalloy substrate which has been aluminized to form a diffused aluminide coating, with a highly adherent protective layer of alumina, $Al_2O_3$.

The invention provides several novel embodiments. One embodiment relates to a coating composition which comprises a slurry containing several metals in elemental powder form (or state), in a liquid binder which is preferably heat-curable. An aspect of the embodiment is a powder which comprises the metal constituents, principally aluminum and silicon and other metals described hereinafter. The powder of the mixture of the metals is admixed with the binder which can be of a wide pH range, preferably an acidic binder.

The invention also provides a method for applying the aqueous composition to a superalloy substrate and forming a coating highly resistant to oxidation and hot corrosion conditions with an improved resistance to developing cracks.

The invention also provides improved coatings which under such demanding conditions have improved resistance to the formation of cracks, especially inception of cracks.

The invention also provides improved work pieces coated with such coatings, for example, parts of gas turbine (industrial, marine and other) like rotor blades, turbine blades, casings and other parts.

The invention provides further novel embodiments.

One embodiment relates to a slurry of eutectic aluminum-silicon powder in a heat-curable liquid binder. The slurry is especially useful to provide coatings for superalloy substrates which in use are frequently exposed to oxygen in gases at high temperatures and which normally tend to develop cracks. The slurry of the invention contributes to overcome these problems. The slurry, optionally, may contain other metals in their elemental state, which contribute additional beneficial properties as described further hereinafter.

The invention in another embodiment, relates to the coatings formed on such superalloys from slurries containing such an eutectic aluminum silicon alloy. The coatings have increased dispersion of the alloys of silicon and the metals of the substrate throughout the coat's thickness. Further, the coatings of the invention have reduced silicon content and increased aluminum distribution in the outer zone of the coatings. The coatings of the invention have excellent properties; especially, they are remarkably resistant to the initiation or start of micro-cracks in the coating and have improved ductility.

A signal aspect of the coatings of the invention is that the suicides are distributed or dispersed (or redistributed) more evenly throughout the thickness of the coatings than in the coatings of the prior art, typically SermaLoy J. In particular, the layering layer instead of being constituted of highly densely packed interleaved layers of aluminide and silicide phases, tends to be less densely (or closely) packed. Under optimum conditions, the silicide layers are more spaced apart, the aluminide layer tends to grow and the silicide particles distributed more evenly throughout that and the other layers of the coating.

Another embodiment of the invention is coating wherein there is no surface layer, i.e., where the first outer layer is what is called the layering zone which comprises layers of silicide and aluminide phases.

The invention further provides a method for preparing the eutectic slurry by bringing together and mixing elemental aluminum and silicon in eutectic proportions, then producing the eutectic alloy powder, then at the appropriate time when desired, mixing the eutectic powder with or without the optional other metal powder into the liquid binder solution.

Another embodiment provides a process for coating a superalloy substrate with the slurry, curing the coatings, diffusion heating the coated substrate and cooling or allowing the coating to cure.

Another embodiment relates to coated parts, generally metal parts having a superalloy component which is coated with the coating of the invention. Parts which benefit particularly from the coating of the invention are parts of gas turbines.

In an aspect of this embodiment, the diffusion process may be applied as many times as deemed necessary in accordance with the process disclosed in above-referred to pending PCT International patent application PCT/US93/04507. Coating with further improved properties are obtainable.

Other embodiments of the invention become apparent from the detailed description provided herein.

In the description of the invention, the terms "zone" and "layer" are used interchangeably.

From the description above and which follows hereinafter, it will be appreciated that one important teaching of the invention relates to the distribution of the silicide and aluminide phases through the coating which distribution is different from the distribution of the alloys in the coatings of the prior art. In particular, the suicides are more evenly distributed throughout the coating.

Studies and experience and in conjunction with this invention with parts exposed to harsh environmental conditions described herein, suggest that the outer silicide phases of a prior art SermaLoy J coating are key to its enhanced hot corrosion resistance. These phases apparently displace some of the vulnerable aluminide phases from the surface layer. Unfortunately, particularly when utilized on superalloys, these critical silicide phases become excessively concentrated in the surface zone of the coating microstructure after a typical coating and diffusion treatment. Silicon content of the surface zone can be as high as about 30–40 wt. %, as opposed to 10–20 wt. % in the bulk of the coating. This seems to render the outer part of the coating prone to micro-cracking after long service. Crack propagation is rapid after crack initiation, even though the threshold for initiation is high. Although the cracks at first appear not very serious, in that they do not propagate into the superalloy substrate, it would be highly desirable to prevent their occurrence or restrict their penetration through the coating, since they eventually open up corrosion paths to the substrate. And, this of course, is a serious problem. The invention contributes to solving this problem.

It further appears that a target aluminum concentration level, at least within nickel aluminide coatings, but perhaps also within cobalt aluminide coatings, should be between about 20–30 wt. %, preferably about 25 to 30 wt. %. Nickel aluminide coatings with aluminum concentrations less than about 20 to 25 wt. % tend to have insufficient oxidation resistance, whereas coatings with aluminum concentrations in excess of about 30 wt. % are prone to cracking and premature failure. This is because a nickel aluminide Coating with high aluminum concentrations tends to produce a multi-phase aluminide structure which adversely affects the mechanical properties of the coating.

One aspect of the present invention provides a slurry coating composition for production of an aluminide-silicide coating. The slurry comprises metallic powder in elemental form in a binder liquid. The metal powder component of the slurry composition in weight percentage terms comprises the following constituents in the stated ranges:

Al—30 to 92.5%, preferably 70 to 92.5%, most preferably 75 to 85%,

Si—5 to 25%, preferably 10 to 25%, most preferably 10 to 20%,

Cr—2.5 to 20%, preferably 3 to 10%, wherein the metal powder constituents are in elemental form.

Further, optional ingredients are Ti, Ta and B, which when present in the composition, are preferably present in the following amounts Ti—0 to 10%, preferably 2 to 5%; Ta—0 to 10%, preferably 2 to 5%, and boron in an amount of 0 to 2.5, preferably about 0.5 to 2%, most preferably from about 0.5 to 1%. Ti and Ta are preferably present together.

From the above, it will be noted that in accordance with the invention, the maximum aluminum content of 92.5% is sufficiently high so that a coating may be made with the stated minimum amounts of the other metallic elements. Similarly, the minimum aluminum content of 30% is sufficiently high so that a coating may be made with the stated maximum amounts of the other metallic elements. Compositions with amounts of metals with depart from the upper and lower maximum stated tend not to give compositions with the desired properties. In particular, the lower the aluminum content of the slurry, the more difficult it is to have the aluminum in the coating melt and diffuse readily. Thus, it is preferred to maintain the range of aluminum content as stated.

It will be noticed that the present invention includes ranges of silicon content in the metal powder component of the slurry which are considerably greater than the 15 wt. % content found in SermaLoy J. It is an important aspect of the invention that as a result of the diffusion heat treatment of coatings formed from such Si-enriched slurries, the coating microstructure becomes richer in silicon, thereby making the silicon more immediately available for combination with chromium and other suicide formers present in the substrate and the coating before the surrounding material becomes relatively depleted of aluminum due to its rapid diffusion through the coating. In accordance with the invention, extra silicon to the slurry formulation also promotes thicker silicide rich surface zones.

Thus, coatings of the invention made from slurries which contain Al in the slurry of metal powders in elemental form below the 85 wt % of Al in SermaLoy J, i.e., from about 65 to below about 85 wt %, distinguish over SermaLoy J by this smaller amount of Al and by the presence of the other metallic elements identified herein.

Likewise, coatings of the invention made from slurries which contain Si in the slurry of metal powder in elemental form below the 15 wt % of Si in SermaLoy J, i.e, from about 5 to below about 15 wt %, distinguish over SermaLoy J by this smaller amount of Si and by the presence of the other metallic elements identified herein.

The coatings of the invention made from slurries which contain Al and Si in the lower ranges specified above distinguish therefore by virtue of these two reduced amounts and the presence of the other metallic components.

Coatings of the invention made from slurries which contain Al and/or Si in excess of 85 wt % for Al and/or Si in excess of 15 wt %, distinguish over SermaLoy J because of the higher amounts of Al and/or Si, respectively. Likewise, it was unexpected that the slurries give such improved coatings.

These various coatings have a combination of advantageous properties which were unpredictable from SermaLoy J, notwithstanding the extensive use and high performance of SermaLoy J.

The chromium metal in the slurry coating composition of the invention is a silicide former, and therefore during the diffusion heat treatment it is attracted to the silicon. Since it is already present throughout the coating at the commencement of diffusion, it binds to the neighboring silicon quickly, producing a more even distribution of silicide phases in the bulk of the coating, than is achievable in the SermaLoy J coating. Since there is no metal in the slurry for which the coating SermaLoy J is made, the latter relies for the production of chromium silicide therein on alloying with chromium present in the metallic substrate. Thus, in the coating of the invention, the chromium silicide is formed principally from the chromium of the coating composition as opposed to that from the substrate.

It was also found in accordance with the invention that addition of even quite small amounts of chromium to the total metallic pigment content of the slurry, say 3 to 5 wt. % at the expense of the aluminum content, can promote thicker silicide rich surface zones and/or layering zones, with fewer cracks, i.e. greater ductility, in the finished coatings. Addition of amounts greater than about 10 to 15 wt. % continues to increase ductility, but at the expense of resistance to hot corrosion.

As a secondary consideration, chromium beneficially modifies the alumina/silica surface oxide scale produced on the coating during service. Like the aluminum and silicon already incorporated in known silicon modified aluminide coatings, chromium when oxidized forms a thin but non-porous surface scale which forms a barrier to further oxidation.

Chromium has a further valuable oxide scale modifying chemical property in common with silicon, in that it forms an acidic oxide which gives good protection against high temperature sulphidation.

Titanium and/or tantalum, which can optionally be included in the slurry coating composition of the invention at the expense of the aluminum content, are strong silicide formers and in this respect supplement the effect given by incorporation of chromium in the slurry. Unexpectedly, it was found that the presence of titanium and/or tantalum in the slurry in amounts of about 2 to 3 wt. % of total metallic pigment content do not have such a pronounced effect on the production of silicides in the layering and aluminide zones of the finished coating as the addition of chromium to the slurry. Instead, they tend to become concentrated into the silicide rich surface zone. That surface zone, it has been found is broader than that in the SermaLoy J coating, besides being chemically different.

Ti and Ta tend to modify the composition of the chromium silicide because both go into solid solution with chromium silicide to produce more complex suicides. They also have an affinity for—and form intermetallic compounds with—nickel, which is present in superalloy and other high-duty metallic substrates. Titanium aids the formation of the protective alumina scale at the coating surface by helping to liberate aluminum from the aluminide subsurface. Titanium is not a very protective oxide scale in itself, but may aid coherence of the alumina scale. On the other hand, tantalum forms a dense stable oxide which is protective.

It was also found that Ti and Ta containing surface zones are more resistant to crack initiation than the narrower surface zones of SermaLoy J coatings. However, unexpectedly, this only appears to be most apparent when Ta and Ti are both present, in that the presence of 2 wt. % Ta without Ti somewhat increases the tendency of the coatings to crack.

Titanium and tantalum may be replaced singly or in combination by other chemically equivalent transition elements of Group 4b and 5b of the Periodic Table including, rhenium, zirconium and hafnium and manganese as part of the total metallic powder content of the slurry.

The optional small amounts of boron which may be included in the slurry can be included at the expense of the aluminum content, in amounts up to 2.5 wt. %, preferably in the range 0.5 to 2 wt. %, most preferably in the range 0.5 to about 1 wt. %, of the total metallic powder content. Boron in small amounts reduces brittleness in the gamma prime nickel intermetallic compound $Ni_3Al$ which is present in the finished coating.

The embodiment of the invention which uses a coating composition which comprises a powder of a mixture of metals in elemental form is illustrated further in the Examples and the Figures herein.

The second important embodiment of the invention does not use aluminum and silicon in elemental form, but a eutectic aluminum-silicon alloy as further described hereinafter. This embodiment of the invention provides a slurry coating composition for production of an aluminide-silicide coating, the slurry comprising metallic powder in a binder liquid, the metallic powder component of the slurry comprising at least an aluminum-silicon alloy of eutectic composition.

The eutectic composition of aluminum-silicon alloy in stoichiometric amount is 11.8 wt % Si, the balance 88.2 wt % being Al. However in accordance with the invention, the respective amounts of the two metals can depart from the specific values i.e., the stoichiometric amount, set forth above by about 7 to about 14 wt % without adversely affecting the metallic powder slurry. Indeed, the respective amounts of the two metals can even depart by a greater percentage. If carried to its logical and practical limits, it will be seen that the eutectic—or near eutectic alloy—will be replaced by substantially, essentially or completely, by Al and Si in elemental form. In such situation, it will be seen that the embodiment of the invention identified herein as the "eutectic embodiment" will gradually, ultimately completely, have become the slurry of "elemental form of the metals" embodiment. In such situation, it will be appreciated that to the extent that the Al and Si are not in stoichiometric amount, the amount of these metals and the others in the slurry should be commensurately adjusted. It should be further appreciated that the significant depression of melting point and resulting energy economy—as taught in the description of the invention herein—attributable to the use of the eutectic alloy, becomes less and less present as one departs therefrom. Accordingly, it can be envisaged that one skilled in the art may use an eutectic alloy not exclusively, and such feature is also within the scope of the teaching of the invention. The invention cannot be avoided by using an eutectic alloy partially in either of the two embodiments of the invention. It has been found in accordance with the invention that use of Al—Si eutectic alloy in the slurry composition tends to promote a deeper, more pronounced, layering zone, with benefits in reduced tendency to crack and enhanced resistance to hot corrosion.

It has also been found unexpectedly that the eutectic Si—Al alloy powder can be used to partially or completely replace the elemental Si and Al powders normally used for SermaLoy J or in the composition of the invention described above which uses elemental Si and Al powders.

In conjunction with the development of the invention relating to the use of an eutectic alloy powder, an explanation to which the inventors do not wish to be held, was developed for the improved coatings obtained. During the diffusion in the heat treatment step in the production of the coating, Al and Si when used as elemental constituents are believed to tend to migrate towards each other and first form an eutectic alloy composition before splitting up to form the aluminide and silicide phases in the coating. By using a eutectic alloy powder in the slurry, chemical combination energy is not wasted for producing the eutectic alloy in the coating. Instead, the Si is retained closer to its original position in the coating and can more quickly combine with silicide formers, thereby, increasing the depth of the layering zone of the coating at the expense of the silicon-rich surface zone.

In accordance with the invention, the amount of Al—Si eutectic alloy in the slurry can vary from about 36 wt. % to 100 wt. % of the total metallic content, dependent upon the optional presence of additional metallic elemental powders. These may be present in the following weight percentage ranges:

Si—0 to about 21%, preferably 5 to about 18%,

Cr—0 to 20%, preferably 3 to about 10%;

Ta—0 to about 10%, preferably not more than about 5%;

Ti—0 to about 10%, preferably not more than about 5%;

B—0 to about 2.5%, preferably not more than about 2%, most preferably not more than about 1%.

At least part of the Ta and/or the Ti constituents, if present, may be replaced by similar amounts of chemically similar transition elements, as described herein above.

Chromium may be incorporated in this embodiment of the invention at the expense of the aluminum content for the same reasons as described above for coating compositions incorporating mixtures of elemental Al and Si powders. However, it was found that when chromium is incorporated in slurries including eutectic Al—Si alloy powder, the resulting structure of the finished coating exhibits an advantageous combination of features, in particular, increased depth of the surface zone and/or increased depth of the layering zone, plus increased dispersion of the silicide phases, i.e., silicides through the aluminide zone.

It was further found that when 2 to 3 wt. % each of tantalum and/or titanium are included in the slurries at the expense of the aluminum content, the Ta and Ti constituents are more evenly dispersed in the finished coating than is the case when they are used in slurries containing only elemental powders, where they tend to be more concentrated near the surface.

Thus, in accordance with the invention, the optional metals used in conjunction with eutectic Al—Si alloy have additional advantages which they appear not to contribute so markedly to the slurry containing only elemental metal powders.

The coating composition which comprises an eutectic Al—Si alloy will be described further herein below.

In addition to the distinguishing features of the coatings of the invention over the prior art coatings as described herein certain coatings of the invention also show one or more of the following additional features.

A silicide-rich surface layer of at least 2 microns thick. A layering layer which for optimum results is of a minimum thickness of 12 microns. A layering layer which is at least four times the thickness of the surface layer and preferably, is at least ten times the thickness of the surface layer.

A surface layer which has a maximum silicon content of less than about 25 wt %. A layering layer and an aluminide layer of more than about 15 but not more than about 30 wt % Si.

A coating in which the aluminum content does not vary by more than about 12, preferably by not more than about 8 wt % throughout the coating.

A layering layer in which the aluminum content does not exceed about 30 wt % and the aluminum and silicon contents therein vary depthwise in approximately inverse proportion to each other.

A surface layer which includes at least one of Ta or Ti in amounts greater than the weight percentage content of the substrate material.

A coating which also contains chromium and having a thicker surface layer and increased dispersion of silicide layers through the coatings.

A coating in which the layer (or zone) identified herein above as the "surface zone" is absent.

These features can be present in the coating individually or in any combination of these individual features.

The binder used for the metallic components of the slurry in accordance with the invention is a liquid, preferably an aqueous liquid which is heat volatile, heat-curable and preferably leaves on the coating an inorganic residue that can be conveniently removed.

Such binders are known. They can be an acidic neutral or basic liquid. They can be organic or inorganic, e.g., aqueous. The binder components of slurries including elemental and/or eutectic alloy powders of Si and Al may be an organic type (such as nitrocellulose or equivalent polymers) or one of the class of inorganic chromate, phosphate, molybdate or tungstate solutions described in U.S. Pat. No. 4,537,632 (particularly columns 9 and 10), U.S. Pat. Nos. 4,606,967 and 4,863,516 (to Sermatech International, Inc.) which are incorporated herein by reference. The binder may also be one of the class of water-soluble basic silicates, which cure to tightly adherent glassy solids by loss of chemically bound water also disclosed therein.

During heating to the diffusion temperature, the coating goes through a curing phase. During the diffusion, the metallic components of the binder are expelled from the coating. Any residue may be removed by brushing or similar suitable action.

An aspect of the invention related closely to the compositional variations outlined above relates to the duration and temperature of the diffusion heat treatment to which a coated article is subjected.

The diffusion heat treatment schedule for a SermaLoy J coated article is chosen to minimize both the effect of the diffusion heat treatment upon the mechanical properties of the substrate, and the effect that subsequent sustained high temperature operation, e.g., on the turbine blades in an engine, has on the microstructure of the coating.

For example, IN-738 nickel base superalloy material which has been coated with SermaLoy J slurry material and cured is normally diffusion heat treated at 870°–885° C. for about two hours. X-40 cobalt base superalloy coated in the same way is normally diffusion heat treated at about 870° C. for about half an hour, before being heated to about 1000° C. and held at the higher temperature for two hours.

Qualitatively, the following effects are noted for variations of temperature and time.

Increases in the time of diffusion heat treatment at set diffusion temperatures tends to make the coating more ductile, hence less prone to cracking.

Significant decreases in the temperature of diffusion heat treatment may be undesirable because of the danger of producing a coating microstructure which is subject to change during subsequent high temperature service in a gas turbine engine, and because of the danger of inadequate diffusion of the coating elements into the base material.

In general, increases in the temperature of diffusion heat treatment for set treatment durations tends to produce a more even distribution of silicon in the coating, leading to greater ductility, but at the expense of resistance to hot corrosion. Decreased resistance to hot corrosion results from excessive migration of the aluminum into the base superalloy material and consequent depletion of the aluminum content of the coating.

However it was found in accordance with the invention, that if the diffusion is carried out at a temperature in excess of about 1000° C., but preferably not more than about 1120° C., the result is a thicker, more ductile coating with less uneven distribution of aluminides and silicides throughout the coating and consequent improved mechanical properties, though with a somewhat reduced resistance to hot corrosion, which may be acceptable where the use for the coated part may be less demanding. When such high diffusion temperature is combined with addition of chromium to the slurry mix, a favorable combination of effects occurs, giving even better ductility and dispersion of suicides through the coating.

If the properties of the substrate material would be adversely affected by such high temperature diffusion, its use may be inadvisable unless it is feasible to restore the substrate material properties by a further heat treatment. Where the properties of a coated part are adversely affected to a degree unacceptable, it is advisable to apply a further heat treatment, for instance by a precipitation heat treatment. For example, IN-738 nickel based superalloy material coated with one of the above slurry mixtures and diffusion heat treated at 1200° C., may have its properties restored by such treatment at 840° C. for 24 hours.

It is important to note that an increase in diffusion temperature much above 1120° C. is likely to result in more seriously decreased resistance to hot corrosion, resulting from increased migration of the aluminum into the base superalloy material and consequent unacceptable depletion of the aluminum content of the coating.

The above described embodiment may be combined with the invention disclosed in our copending International patent application number PCT/US93/04507.

The following examples are intended and do not limit the invention in any manner whatsoever.

EXAMPLES OF THE INVENTION AND COMPARISONS WITH PRIOR ART

Experimental Strategy

Samples of various combinations of process and chemical composition alterations with respect to SermaLoy J were evaluated. A selection of such variation are shown in Table 1. The variables used, and the aims of the alterations, can be summarized as follows.

TABLE 1

| | Alloy* | METALLIC CONSTITUENTS (WT. % OF TOTAL METALLIC POWDER MIX) Elements | | | | | | DIFFUSION HEAT TREATMENT |
|---|---|---|---|---|---|---|---|---|
| SAMPLE | Al,Si | Al | Si | Cr | Ta | Ti | B | Hours @ °C. |
| 1A1 | — | 85 | 15 | — | — | — | — | 2 @ 870 |
| 1A2 | — | 72 | 25 | — | 2 | — | 1 | " |
| 1A3 | — | 80.5 | 15 | — | 2 | 2.5 | — | " |
| 1A4 | — | 71.5 | 25 | — | — | 2.5 | 1 | " |
| 1A5 | — | 77 | 15 | 5 | 2 | — | 1 | " |
| 1A6 | — | 70 | 25 | 5 | — | — | — | " |
| 1A7 | — | 76.5 | 15 | 5 | — | 2.5 | 1 | " |
| 1A8 | — | 65.5 | 25 | 5 | 2 | 2.5 | — | " |
| 1A9 | 100 | — | — | — | — | — | — | " |
| 1A10 | 87 | — | 10 | — | 2 | — | 1 | " |
| 1A11 | 95.5 | — | — | — | 2 | 2.5 | — | " |
| 1A12 | 86.5 | — | 10 | — | — | 2.5 | 1 | " |
| 1A13 | 92 | — | — | 5 | 2 | — | 1 | " |
| 1A14 | 85 | — | 10 | 5 | — | — | — | " |
| 1A15 | 89.5 | — | — | 5 | 2 | 2.5 | 1 | " |
| 1A16 | 82.5 | — | 10 | 5 | — | 2.5 | — | " |
| 1B1 | — | 85 | 15 | — | — | — | — | 2 @ 760 |
| 1B3 | — | 75 | 15 | 10 | — | — | 1 | 2 @ 760 + 2 @ 1120 |
| 1B9 | 100 | — | — | — | — | — | — | " |
| 1B18 | — | 75 | 15 | 10 | — | — | — | 2 @ 885 + 2 @ 1120 |
| 1B21 | — | 85 | 15 | — | — | — | — | " |
| 9U | 69.3 | 17 | 10.4 | 3.3 | — | — | — | 2 @ 885 |
| 3E | — | 95 | 5 | — | — | — | — | " |
| 4E | — | 75 | 15 | 10 | — | — | — | " |
| 7E | — | 81.7 | 11.7 | 6.7 | — | — | — | " |
| 8E | — | 78.3 | 8.3 | 13.4 | — | — | — | " |
| 9E | — | 78.3 | 18.3 | 3.3 | — | — | — | " |

*Eutectic alloy composition = 88.2 wt. % Al, 11.8 wt. % Si

EXAMPLE 1

The aluminum and silicon powders used in the slurries: in some slurries, instead of the Al and Si powders being in elemental form, as for normal SermaLoy J, Al/Si alloy powder of eutectic composition was used. This reduced the freedom of Al and Si to diffuse through the coating independently of each other, thereby reducing Si concentration in the surface zone.

EXAMPLE 2

Addition of certain metallic elements to the slurry which are strong silicide formers: these were (in weight percent relative to the total metallic pigment content of the coating), Cr 5% or 10%, Ti 2.5%, Ta 2.5%. This controlled the movement of silicon during diffusion heat treatment and resulted in good silicide formation throughout the coating.

EXAMPLE 3

Alteration of amount of Al in the slurry: Al content relative to the total metallic pigment content of the coating was varied in the range 65 to 95 wt. %.

In the part of the range below the normal SermaLoy J Al content of 85 wt. %, relative reduction of Al content allowed the introduction of the extra metallic elements mentioned in (ii) above, i.e they were introduced at the expense of the Al weight percentage content.

In the part of the range above 85 wt. %, this produced an excess of Al in the slurry during diffusion heat treatment, thereby diluting the outer normally Si-rich surface zone.

EXAMPLE 4

Alteration of the amount of Si in the slurry: Si content relative to the total metallic pigment content of the coating was varied in the range 5 to 25 wt. %.

In the part of the range below the normal SermaLoy J silicon content of 15 wt. %, relative reduction of Si content allowed the addition of extra Al.

In the part of the range above 15 wt. %, this produced a thicker Si-enriched surface zone better able to resist crack initiation, and also promoted more diffusion of Si through the coating, thus deepening the layering zone and reducing thermal expansion mismatch between the surface zone silicides and the aluminides, and their oxide scales.

EXAMPLE 5

Addition of 1 wt. % boron to the slurry. This rendered the aluminide phases more ductile.

EXAMPLE 6

Changes to diffusion heat treatment temperatures. Different temperatures tried: 760° C., 870° C., 885° C. and 1120° C. Reduction of temperature below the normal SermaLoy J diffusion temperatures of 870° C. to 885° C. reduced the rate of diffusion of Al, thereby increasing Al concentration in the surface zone of the coating. Increasing diffusion temperature above the normal for SermaLoy J increased the diffusion rate of the heavier substrate material elements without greatly increasing the Al diffusion rate, thereby lowering both Al and Si concentration in the surface zone.

EXAMPLE 7

Changes to diffusion heat treatment times. Different times were tried: 2, 3.5, 4, 5, 6.5, and 8 hours. The increase of diffusion time above the diffusion time of 2 hours customarily applied to SermaLoy J caused the diffusion of the coating to be complete.

Preparation of Samples

In the studies in connection with this invention, variations in coating composition and processing were investigated, some of which are shown in Table 1. Samples of nickel base superalloy material, comprising discs made from IN-738 superalloy, were given either a standard SermaLoy J aluminide-silicide coating, or a coating having modified composition and/or processing. The discs were 12 mm in diameter and 5 mm thick.

The approximate specification of IN-738 in wt. % by constituents is as follows: 60 Ni, 16Cr, 8.5Co, 3.45Ti, 3.45Al, 2.6W, 1.7Mo, 1.7Ta, 0.8Nb, 0.5Fe, 0.5Si, 0.2Mn, 0.17C, 0.1Zr, 0.01B As examples of the make-up of the slurries used in the investigation, the ingredients of two slurries of different composition are detailed below.

Slurry A:

| | |
|---|---|
| 95.0 ml | water |
| 31.5 gm | phosphoric acid |
| 9.0 gm | chromic acid |
| 7.3 gm | magnesium oxide |
| 82.0 gm | aluminum powder (under 5 microns diameter) |
| 14.5 gm | silicon powder (−325 mesh) |

Slurry B

| | |
|---|---|
| 100.0 ml | Slurry A |
| 7.0 gm | chromium powder (under 5 microns diameter) |

Other slurries were prepared which contained a eutectic aluminum-silicon alloy powder with and without the other metallic elements described below.

Slurry A corresponds to Slurry Sample Number 1A1 in Table 1 and is a normal slurry composition for SermaLoy J, having a solids content of approximately 60 wt. %. It gives a coating in which aluminum provides 85 wt. % of the total metal powder content and silicon provides 15 wt. %. Upon being made up, the second, third and fourth ingredients combine to form a magnesium salt of chromic and phosphoric acid, this being the binder for the metallic constituents to enable curing of the coating, but which is later expelled from the coating upon diffusion heat treatment.

Slurry B has sufficient chromium powder added to make a coating in which 10 wt. % of the total metal powder content is chromium. It corresponds to Slurry Sample Number 1B3 in Table 1.

Prior to application of the slurry, the samples were degreased in hot vapor of 1,1,1-trichloroethane, then blasted with 90/120 mesh alumina grit to prepare the surfaces for coating. Grit blasting was done in a pressure cabinet at a pressure of 20 psi or 138 kPa.

A thin wet coat of each slurry was applied to the blasted samples using a conventional air atomizing spray gun. After allowing the water to evaporate, the sprayed slurry coat was dried at 80° C. (175° F.) for at least 15 minutes, then cured for 30 minutes at 350° C. (660° F.).

Curing temperatures for conventional coatings are suitable. It is possible to cure at higher temperatures, for instance to about 600° C., to accelerate the curing process, provided the temperature chosen is adequately below the melting point of aluminum. It would also be possible to cure at lower temperatures, consistent with achieving curing within a reasonable time.

When the samples had cooled, the coating thickness was built up by applying and curing further slurry coats following the procedure outlined above. The weight (thickness) of coating applied in this way to the samples was standardized at a total of about 18–27 mg/cm$^2$ of cured slurry. The lower end of the range is more suited to conventional SermaLoy J coatings, while the upper end of the range is more suited to the heavier weight coatings of the invention which incorporate the heavy metal chromium as a significant constituent.

Each one of the coated samples was then subjected to one of the specified diffusion heat treatment schedules. For many of the samples, this involved the normal SermaLoy J heat treatment comprising heating to 870° C. (1600° F.) or 885° C. (1625° F.) and holding at that temperature for two hours to inter-diffuse the coating constituents and the base material. For others, it involved changes in temperature and cycle time as described herein and other.

When the samples had cooled after heat treatment, undiffused residues were removed by lightly blasting with −140 +220 glass beads at 20 psi (138 kPa) in a suction blaster. In some variants of the heat treatment schedules, samples were subjected to this cleaning treatment between first and second periods of heat treatment, e.g sample 1B9 in Table 1.

All diffused samples were sectioned, mounted and polished on standard laboratory apparatus. Sectioning was done using a conventional elastic slitting wheel with coolant, as is used for normal SermaLoy J production coating test piece evaluation.

Table 1 above shows various samples, their constitution and heat treatment thereof.

MICROSCOPIC AND ELECTRON PROBE EXAMINATION OF SAMPLES

Initial assessment of the diffused coatings was undertaken by optical or electron microscopy and Electron Probe Micro Analysis (EPMA).

All diffused samples were inspected visually, by low power binoculars (×40), and microscopically. Notes of the condition, colour and microstructure, etc., were taken for each sample. In particular, the sectioned samples were examined for micro-cracking resulting from the sectioning process, which gave an indication of coating brittleness and response to stresses. Some of the samples were subjected to X-ray mapping to detect cracks and to EPMA to identify where the individual elements were in the coating and their concentration levels.

Typical photomicrographs of the coating sections seen in these samples are shown in FIGS. 4 to 13, 26 to 30 and 32 and examples of EPMA are shown in FIGS. 14 to 22 and 31, corresponding to the microstructure FIGS. 14 to 22. The origins of the EPMA graphs (i.e. the baselines for the beginning of each scan by the electron probe) were just beyond the outer surface of the coating.

Different zones of the photomicrograph sections are indicated by the following letter key:

A. Sample mounting compound (e.g., "Bakelite"—trade mark)

B. Nickel plate—some coating surfaces were nickel plated during sample preparation.

C. Silicon-rich surface zone, where chromium silicide and other silicides are particularly concentrated. This zone is patchy or absent in some samples.

D. Layering zone, comprising alternate interleaved layers of silicide and aluminide phases—this zone is not always distinguished clearly from other zones.

E. Aluminide zone, predominantly comprising aluminide phases, but with greater or lesser amounts of silicide precipitates.

X. Precipitate zone. In samples diffused at high temperatures, an aluminide zone with pronounced silicide precipitates of refractory metals, but with lower aluminum concentration than in samples diffused at normal diffusion temperatures.

Y. Nickel-rich zone. In samples diffused at high temperatures, an aluminide zone with high nickel content.

F. Interface diffusion zone. At the interface between the coating and the substrate material, where the grain structure has been visibly altered by the diffusion process.

G. Substrate material—in all the samples. This was IN 738 superalloy material.

Figure 4:
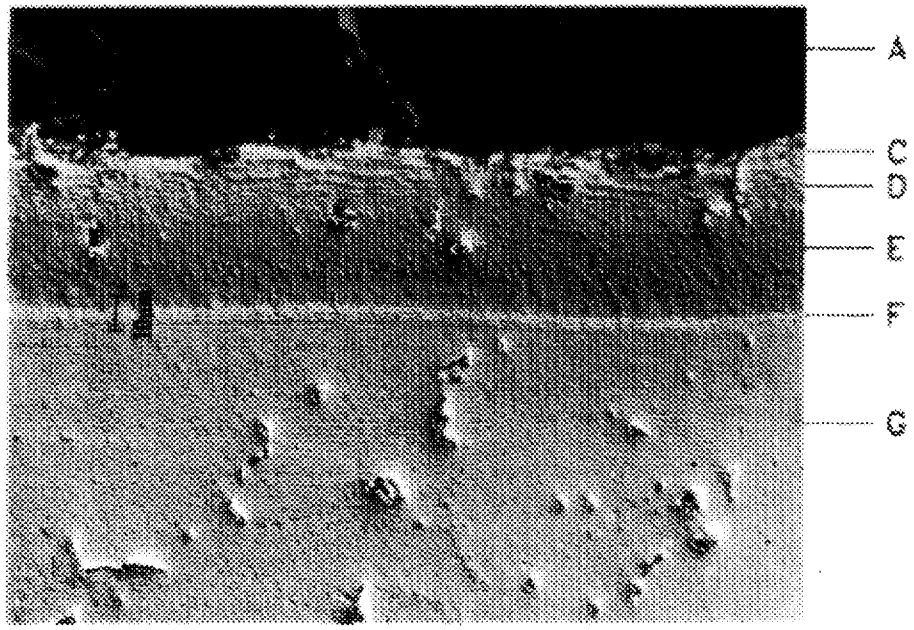
FIG. 4 shows a photomicrograph view at 500X magnification of a cross section through a normal SermaLoy J aluminide-silicide coating sample, the coating being on a nickel based superalloy substrate.

FIG. 4 shows a conventional SermaLoy J coating microstructure as produced on an IN-738 substrate and subjected to the normal diffusion heat treatment process as specified above.

As seen in FIG. 4, the coating is about 5 μm thick in total and exhibits the above zones C, D, E, and F. The silicon-rich surface zone C is only about 5 μm thick. Layering zone D, where aluminide phases and silicide phases are interleaved with each other, is about 15 μm thick, but the layers are somewhat discontinuous. Alumuinide zone E exhibits silicide precipitates. Interface diffusion zone F is about 5 μm thick. The latter zone is not counted as part of the thickness of the coating for present purposes, since it partakes of the character of both the coating and the substrate material G. Zones X and Y are not present, since this sample was diffused at only 870° C.

Figure 14A:
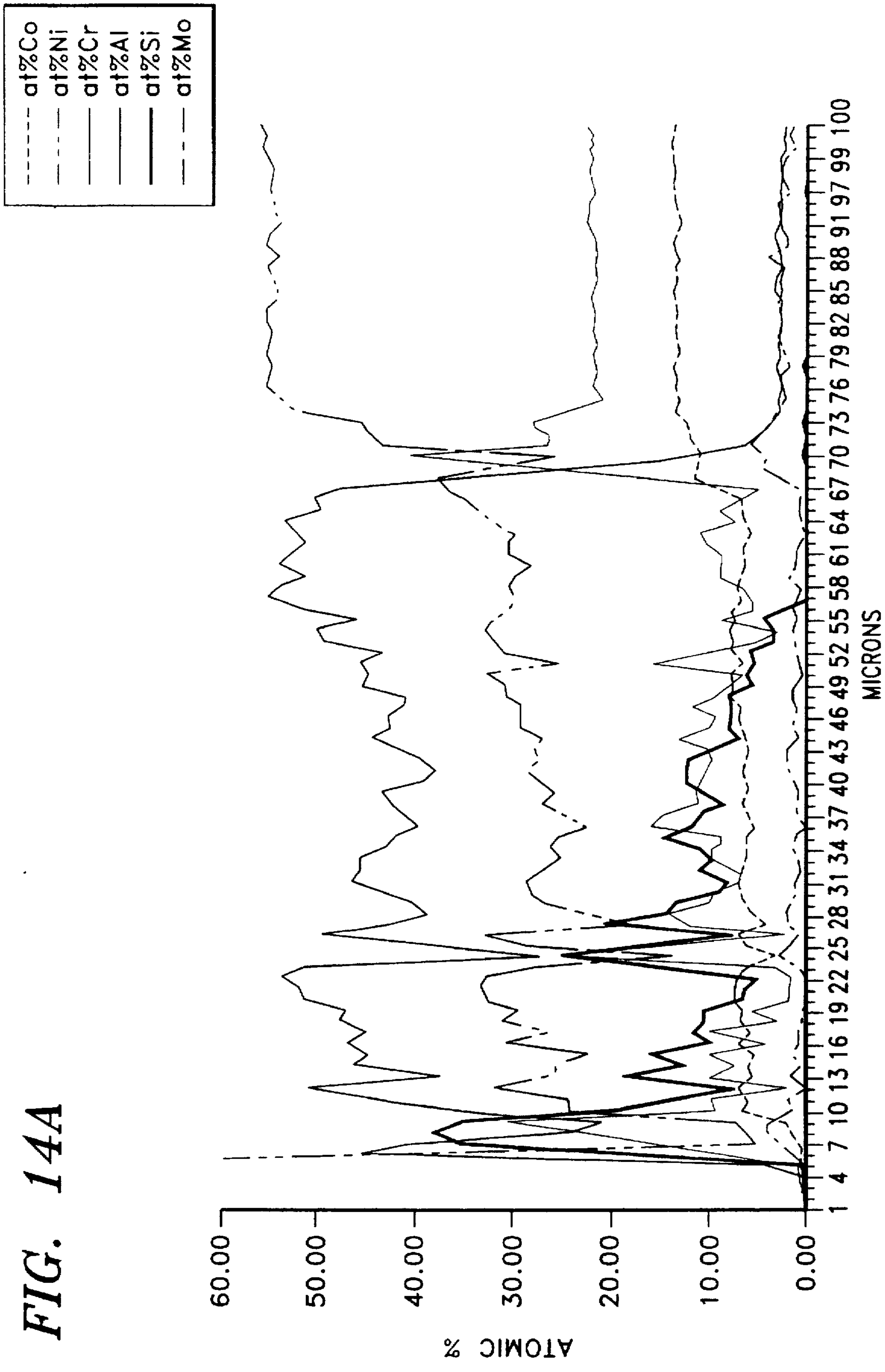
FIGS. 14A and 14B are graphs showing the result of Electron Probe Micro Analysis (EPMA) for the distribution of various protective coating and superalloy substrate elements throughout the coating as shown in FIG. 4, with elemental abundances in atomic percentages for FIG. 14A and in weight percentages for FIG. 14B plotted against a scale of microns through the sample.
Figure 14B:
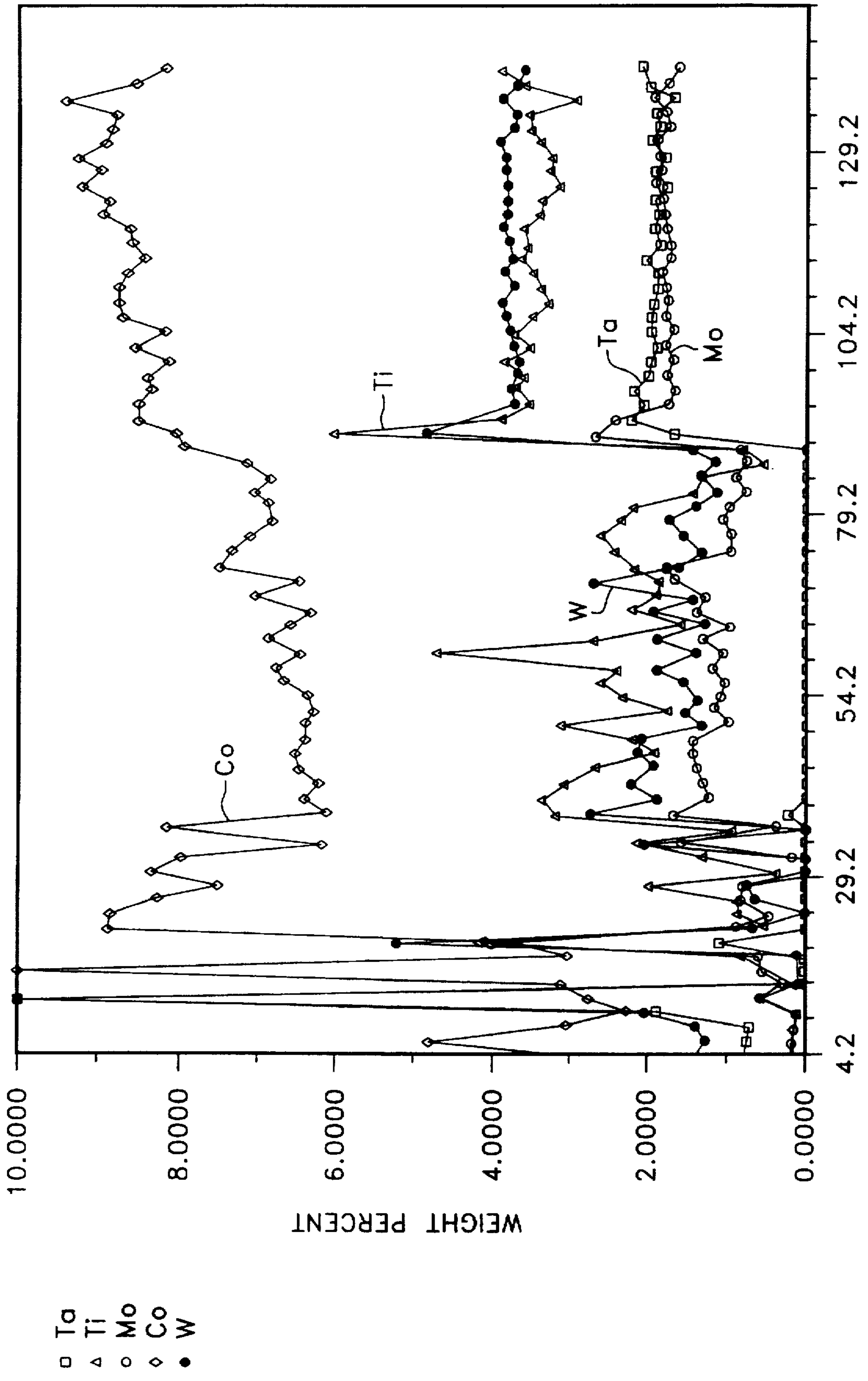

The sample was subjected to EPMA with the result shown in FIGS. 14A and 14B, confirming that the coating is a composite of nickel aluminide and silicides, primarily chromium silicides. During diffusion of SermaLoy J the affinities of Al for Ni and Si for Cr are the dominant features. The measured concentration of silicon in the surface zone is as high as 38 atomic % (34 wt. %) silicon at locations within the first 10 microns of the coating surface. Cracks were found in the sample of FIG. 4 when it was subject to visual and X-ray mapping inspection.

For SermaLoy J, there is a high level of silicon segregation in the surface zone, which explains its superior protection over normal aluminides. However, this silicon concentration promotes rapid crack propagation after crack initiation even though threshold for initiation is high.

Nickel aluminides with higher aluminum concentration tend to produce multi-phase structures which adversely affect the mechanical properties of the coating. It is recognized that a target aluminum level within the coating should be between 25–30 wt. %, whereas FIG. 14 shows Al levels consistently well above 40 atomic %, 28.6 wt. %, peaking to over 50 atomic %, 35.7 wt. %.

As a result of the microscopic and EPMA observations, the following conclusions were drawn concerning the effectiveness of the compositional and process variations described above.

SUMMARY OF OBSERVATIONS AND CONCLUSIONS

For convenience of reference to the relative thicknesses of the zones which are apparent in FIGS. 4 to 13, the following Table 2 should be consulted. Against each selected sample number are given the total coating thickness in microns, the approximate percentage increase in total thickness of coating for each sample relative to the standard SermaLoy J sample, and the thicknesses in microns of each of zones C,D,E,X,Y and F, where present. Also shown in parentheses adjacent each absolute zone thickness is its thickness as a percentage of the total coating thickness. However, no percentage values are shown for zone F, since this zone is not counted as part of the total thickness of the coating.

TABLE 2

| | TOTAL COATING THICKNESS | % INCREASE | ZONE THICKNESS, μm (% OF TOTAL) | | | | | |
|---|---|---|---|---|---|---|---|---|
| SAMPLE | (in μm) | ON J | C | D | E | X | Y | F |
| J | 50 | (—) | 5(10) | 15(30) | 30(60) | — | — | 5(—) |
| 1A6 | 70 | (40) | 10(14) | 10(14) | 50(71) | — | — | 5(—)* |
| 1A9 | 85 | (70) | ? | 35(41) | 50(59) | — | — | 5(—)* |
| 1A15 | | | | | | | | |
| 90 | 60 | (20) | 2(3) | 20(33) | 40(67) | — | — | 5(—)* |
| 4E | 50 | (0) | ? | 50(100) | — | — | — | 5(—) |
| 7E | 52 | (4) | 2(4) | 25(48) | 25(48) | — | — | 5(—)* |
| 8E | 57 | (14) | — | 30(53) | 20(35) | — | 7(12) | 7(—) |
| 9E | 50 | (0) | ?3(6) | 12(24) | 30(60) | — | 7(14) | 5(—)* |
| 1B9 | 115 | (130) | 5(4) | 25(22) | — | 40(35) | 40(35) | 20(—) |
| 1B18 | 90 | (80) | ? | 30(33) | — | 35(39) | 25(28) | 20(—) |

? = patchy
() = %
— = absent
* = best hot corrosion performers
COMMENTS:
1. Al/Si Eutectic Powder: tends to reduce C, thicken absolute D, tends to thicken D %
2. Increasing Cr leads to thicker coatings (but not so pronounced as 1. above) and: tends to reduce C, thicken absolute D, tends to thicken D %
3. Increasing diffusion temperature leads to much thicker coatings.

Effects of Additional Metals (i) Adding Silicide Formers to the Slurry

FIGS. 10 to 13 show samples in which metallic content of the coating as applied and cured comprised elemental powders modified by the addition of various amounts of chromium from about 3 to 13 wt. %. Diffusion heat treatment was at 885° C. for two hours.

It will be seen from Table 2 that as more chromium is added, zone C in the samples while zone reduced in thickness, while zone D tends to increase in thickness.

Figure 10:
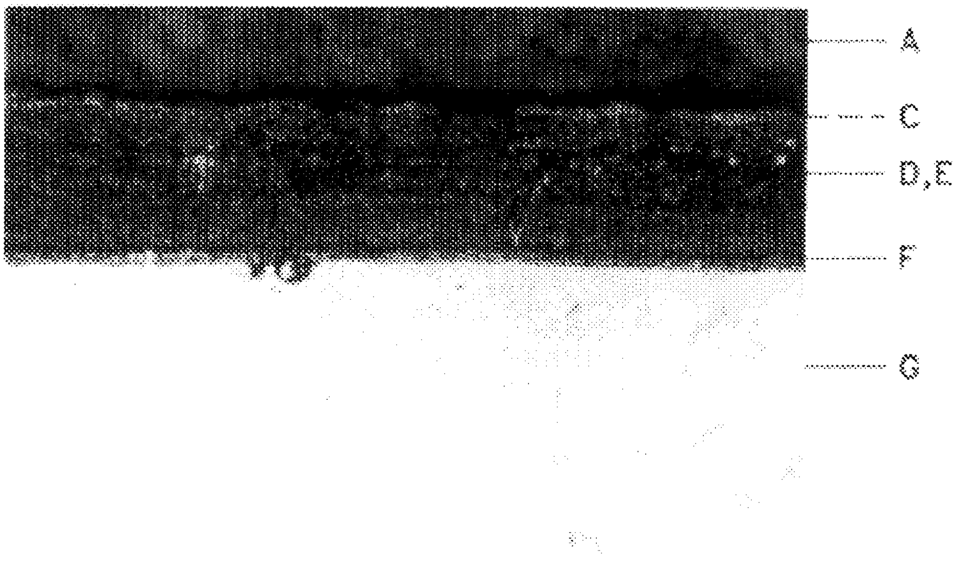
Figure 11:
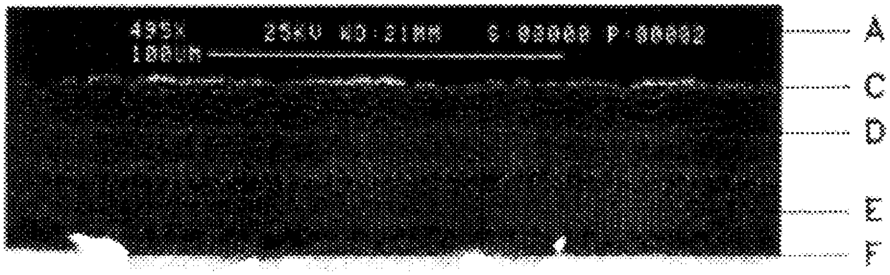
Figure 12:
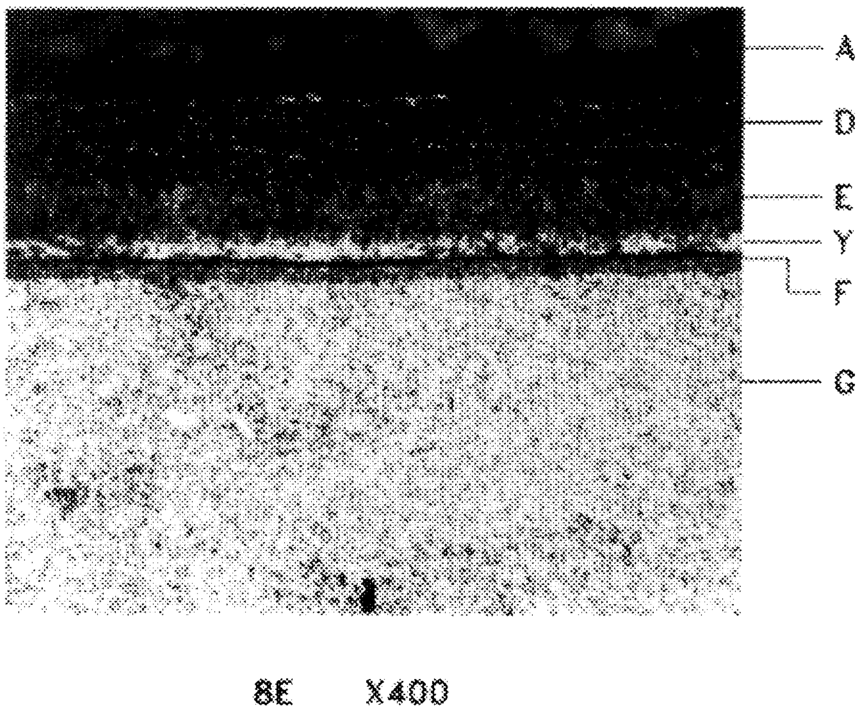

Of note in FIGS. 10 and 12 is that the high chromium content of 10 and 13.4 wt. % in samples 4E and 8E, respectively, has much reduced the prominence of the surface zone and induced good silicide layering and precipitation throughout the rest of the coating thickness. In FIG. 10, the layering appears to extend through zone E as well, though the layering is not so pronounced in the bottom half of the coating depth. FIG. 11, where the Cr content is only 6.7 wt. %, shows a slightly more pronounced surface zone C, with the rest of the coating equally divided between zones D and E. Zone E in particular exhibits good silicide formation.

Figure 13:
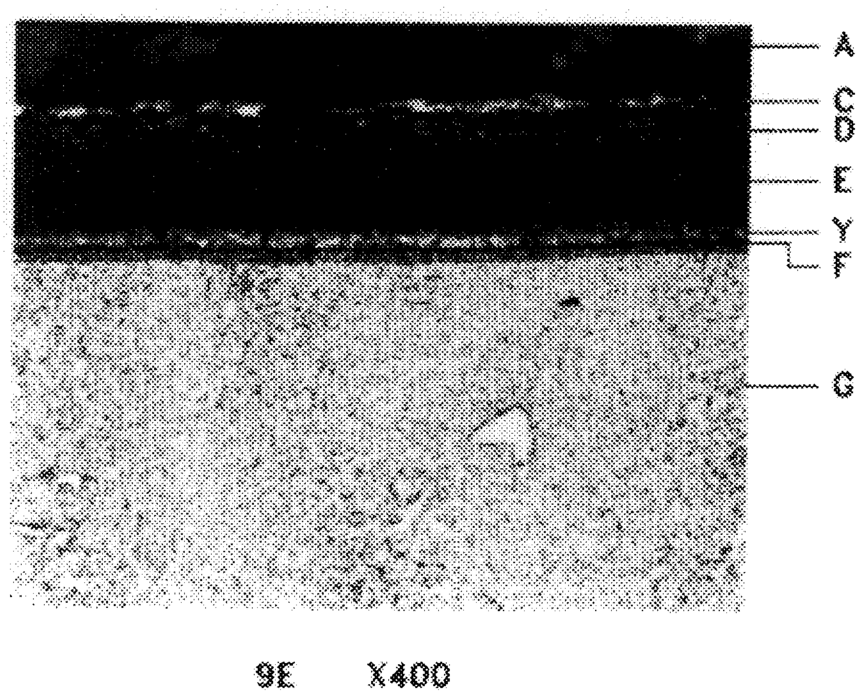

Sample 9E, FIG. 13, has only 3.3 wt. % Cr and an increased-silicon content compared to sample J, resulting in a more pronounced silicon-rich surface zone C, but a thinner layering zone E.

Figure 5:
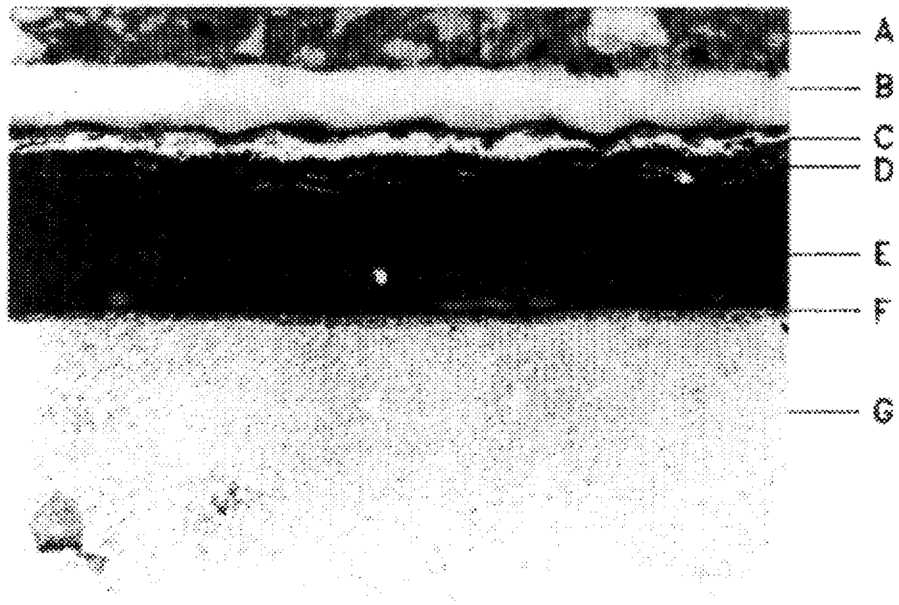
FIGS. 5 to 13 are similar photomicrographs through other aluminide-silicide coating samples whose structure, composition or heat treatment have been modified in accordance with the present invention.

FIG. 5 shows coating sample 1A6, in which metallic content of the coating as applied and cured comprised elemental powders modified by the addition of 10 wt. % silicon and 5 wt. % chromium at the expense of the aluminum content. Diffusion heat treatment was the same as normally used for SermaLoy J. The surface layer zone C is now appreciably thicker than in sample J, with zone D quite thin and not very pronounced. However, the coating is 40% thicker than sample J, and referring to the EPMA result in FIG. 18, it should be noted that the wt. % levels of Si, Al, Cr and Ni throughout the coating depth are much more constant than for sample J. In particular, it should be noted that Al content is about 20 to 24 wt. % throughout and the maximum measured silicon concentration in the top zone of the coating is 10 wt. %. The conclusion to be drawn is that addition of Cr has helped to disperse Si through the coating, but the additional Si has also helped to form the thicker zone C.

No cracks were found on sample 1A6, showing a good degree of ductility.

In general, examination of other samples not illustrated showed that addition of chromium to the slurries promoted thicker layering zone D at the expense of the silicon-rich surface zone C. It also increased dispersion of silicides through zone E. Extra silicon could be added to encourage formation of a thicker silicon-rich surface zone C, if desired.

However, when chromium was added to slurries including Al—Si eutectic alloy, the effect was not so pronounced.

Figure 15A:
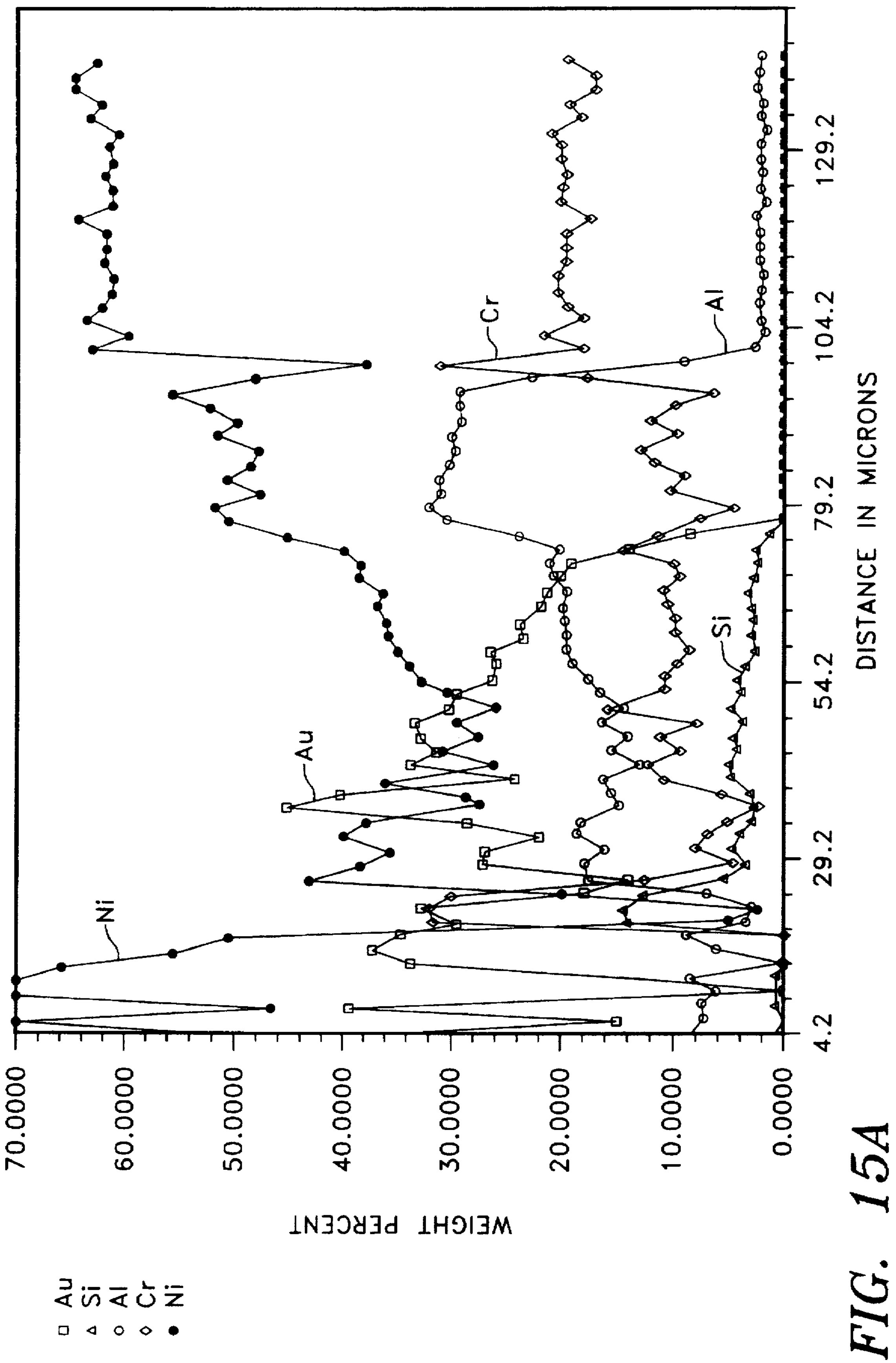
FIGS. 15 to 22, show graphs of the results of EPMA for other selected coating samples, with elemental abundances in weight percentages plotted against a scale of microns through the samples.
Figure 15B:
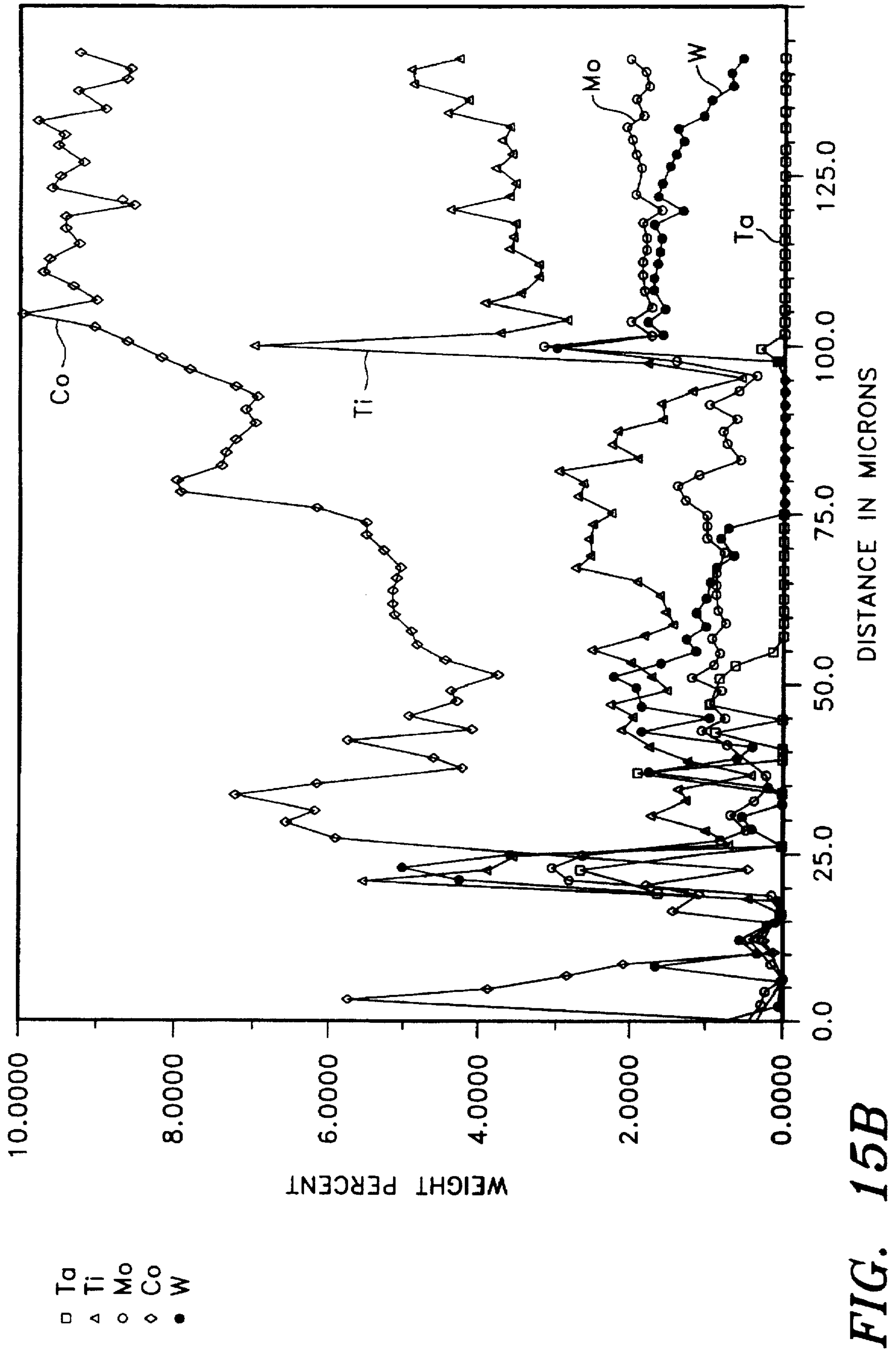
Figure 16A:
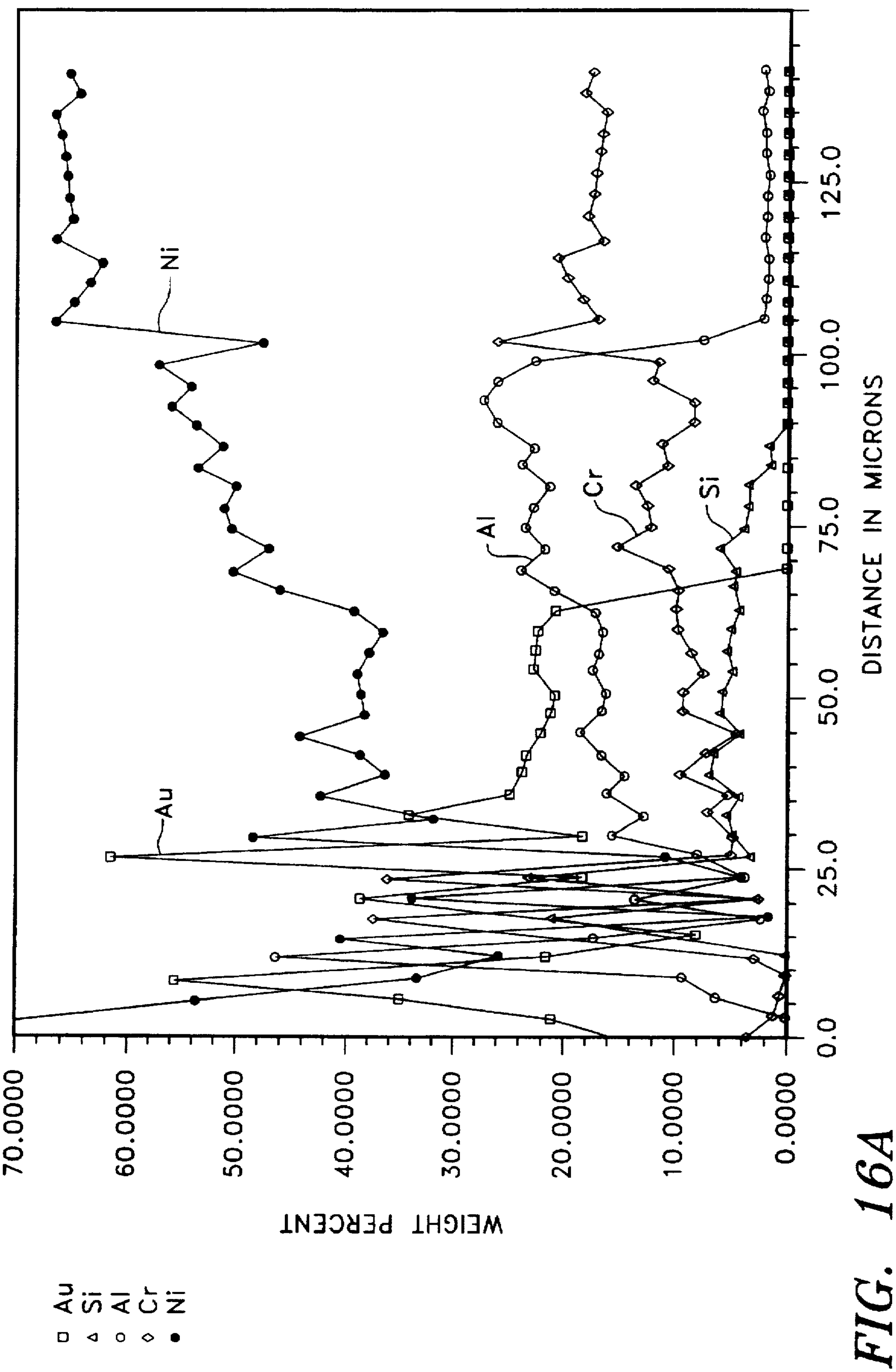
Figure 16B:
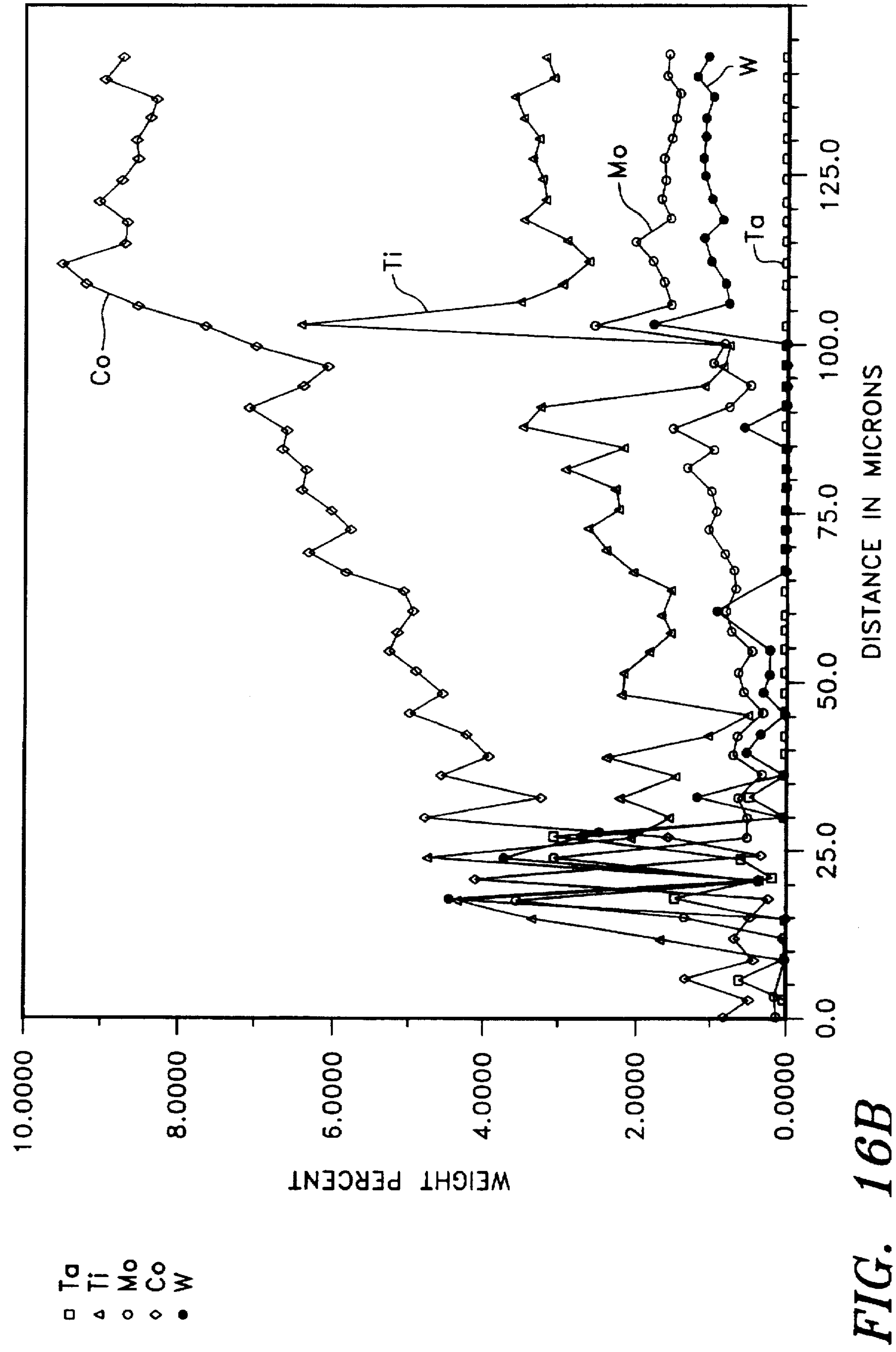
Figure 19A:
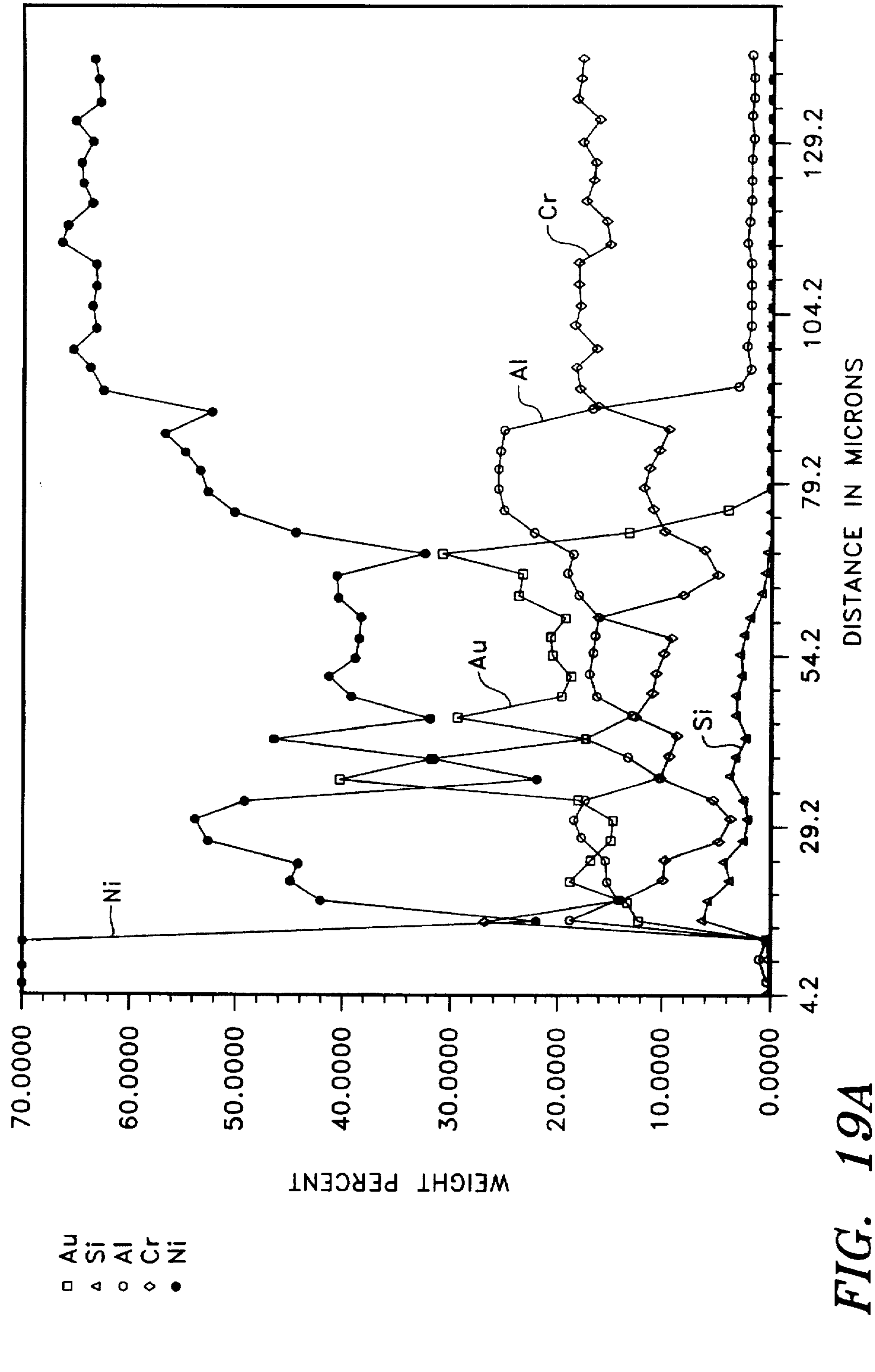
Figure 19B:
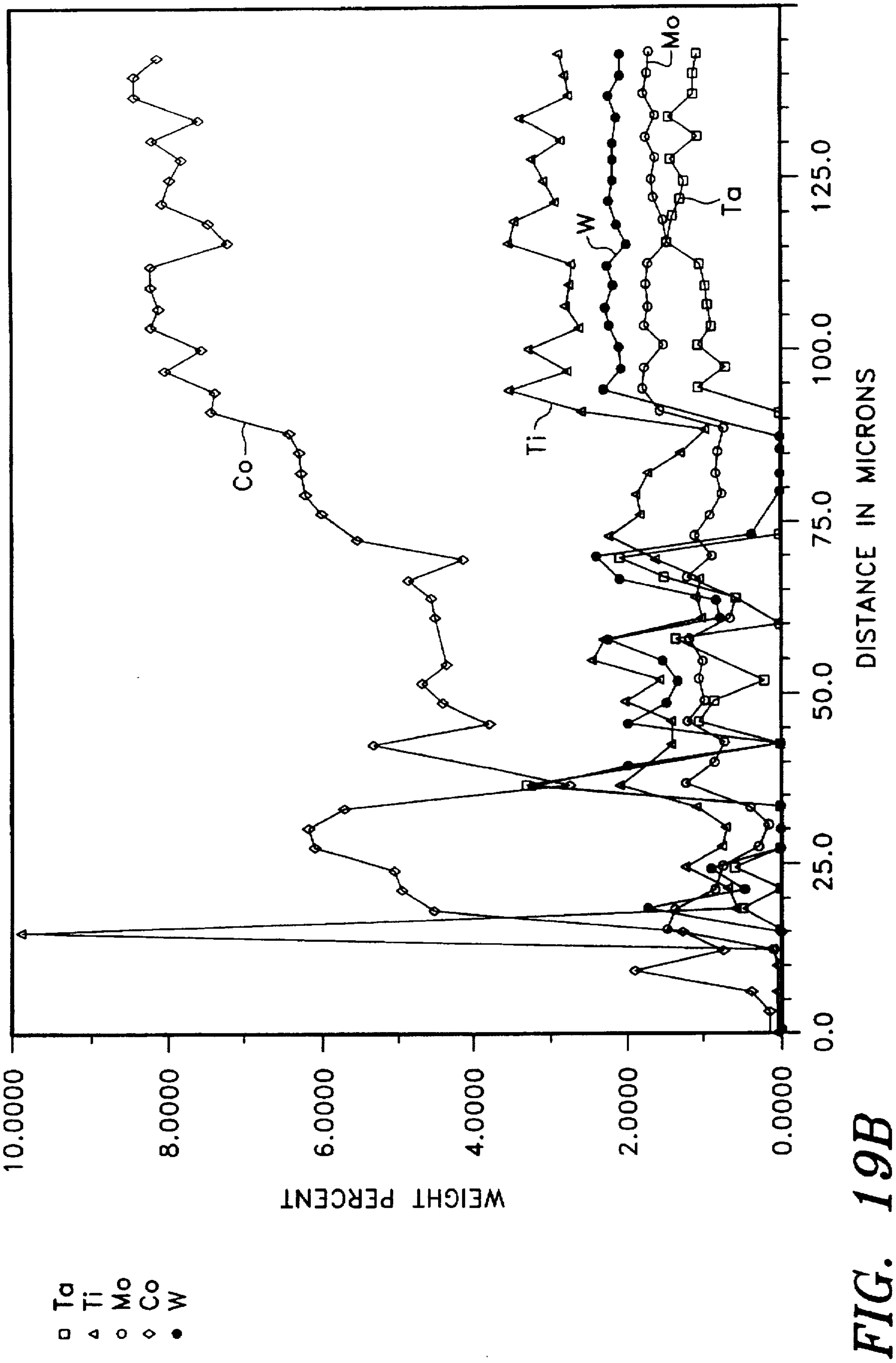

Results from addition of tantalum and titanium to the slurry coating showed a different effect, as is evident from FIGS. 15 to 16 and 19.

Figure 17A:
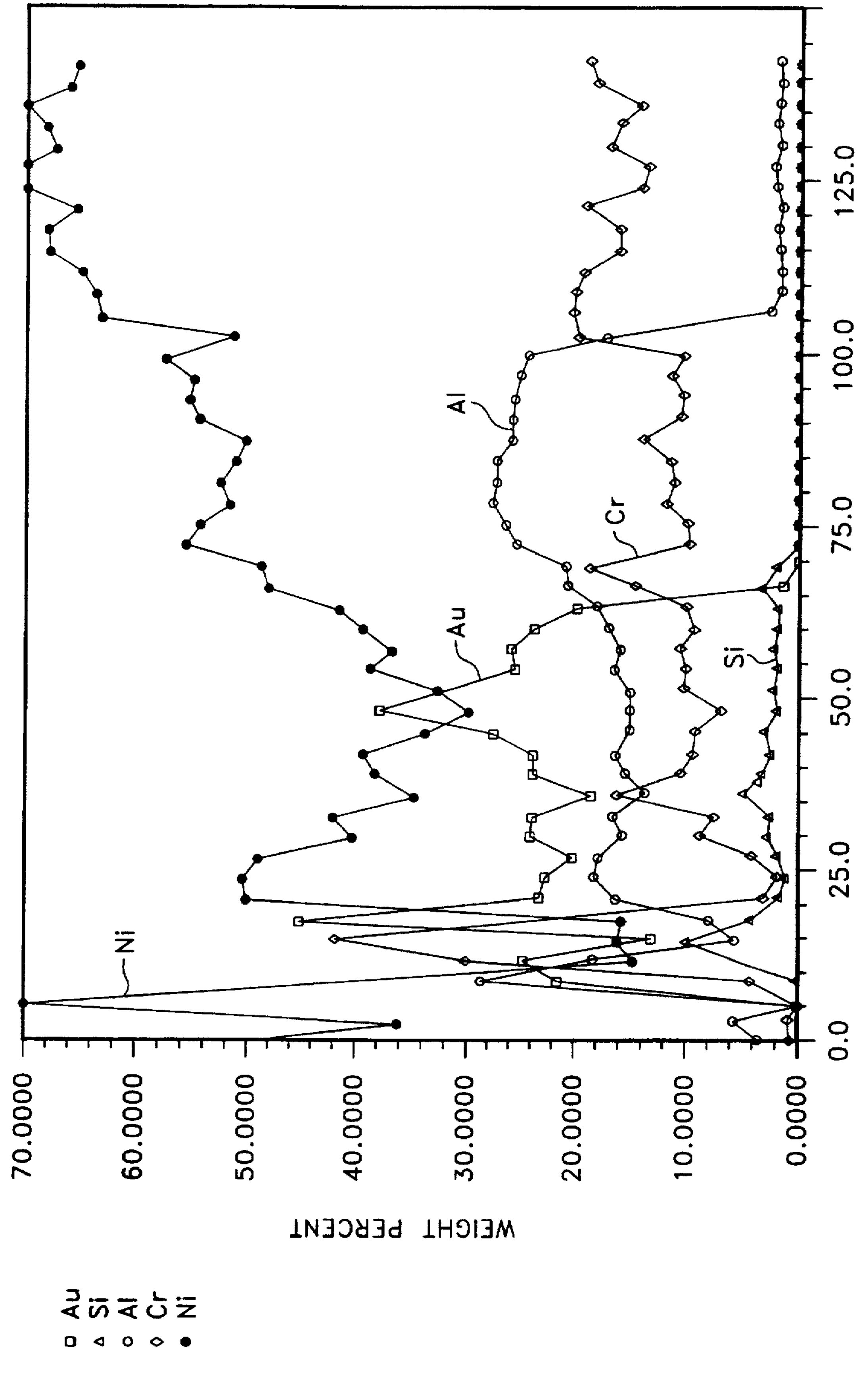
Figure 17B:
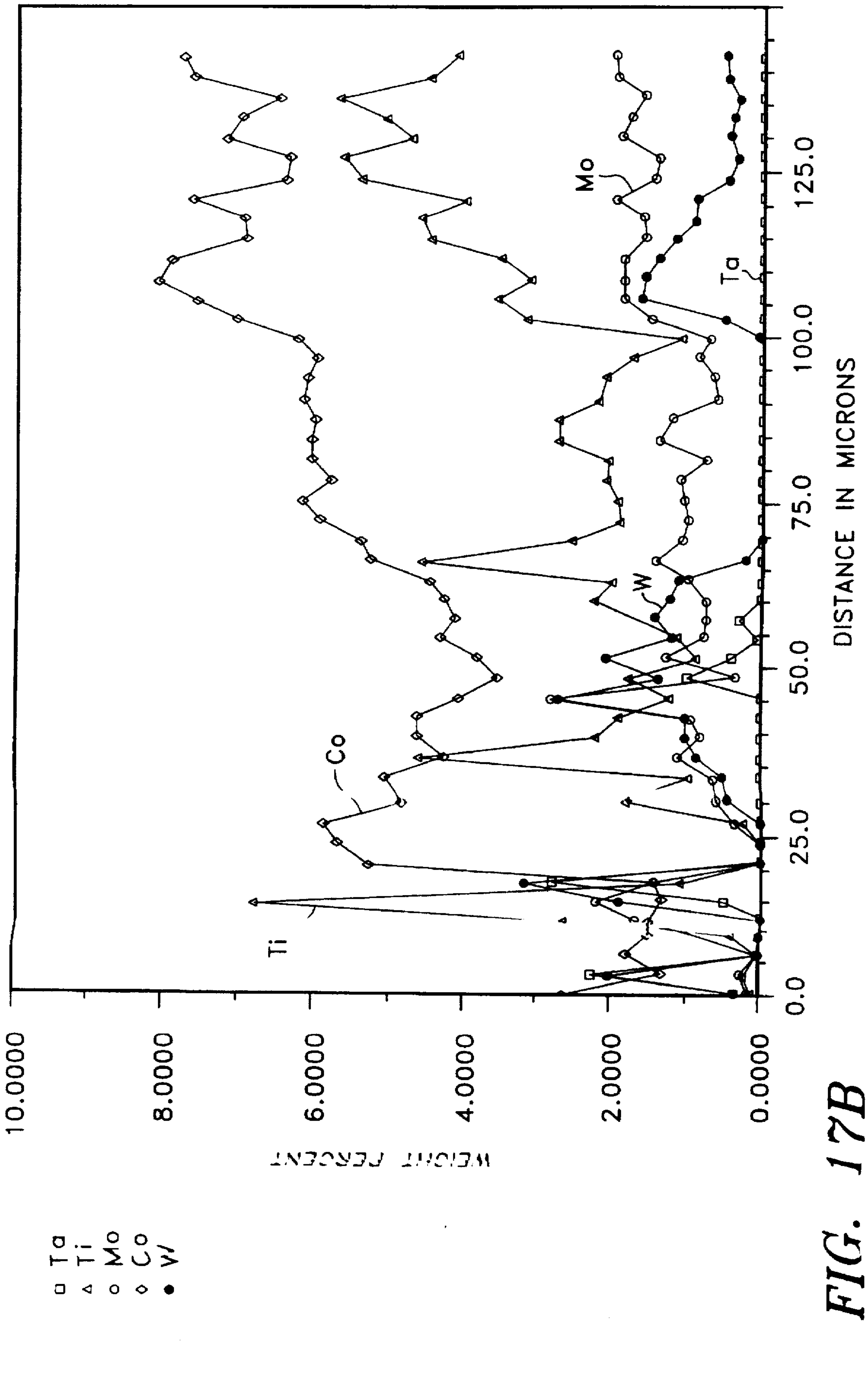
Figure 18:
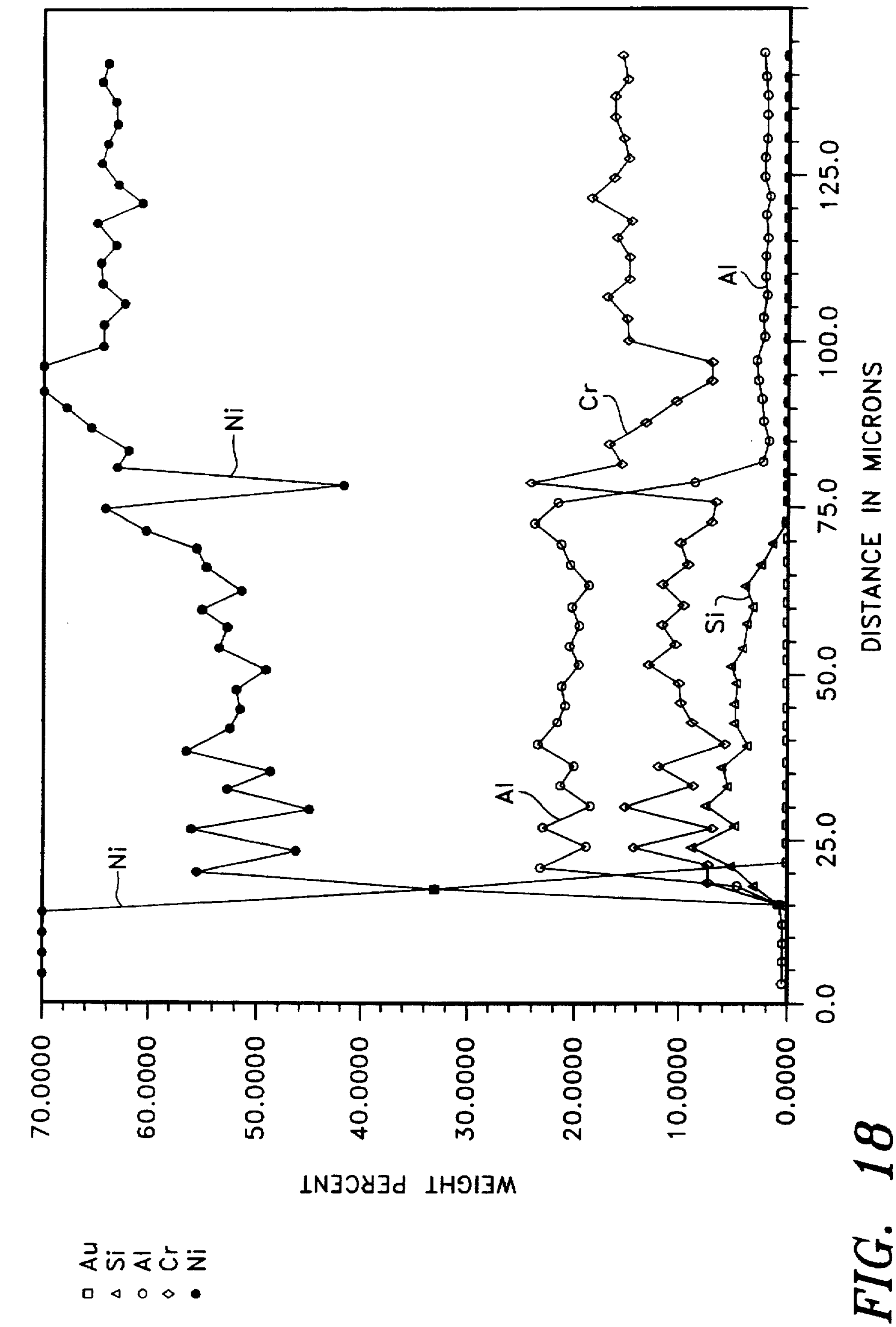

When used on IN 738 substrate, SermaLoy J coating concentrations of Ta and Ti in the silicon-rich surface zone C are about 1 wt. % and 4 wt. % respectively, see FIG. 14A. However, sample 1A2, FIG. 15B, and sample 1A5, FIG. 17B, show Ta concentrations up to about 3%, whereas samples 1A4 and 1A7 show Ti concentrations up to about 5% and 10% respectively. The EPMA's plotted here show that the added amounts of Ta and Ti were incorporated in the finished coating, but instead of forming suicides within the body of the coating, Ta and Ti became concentrated in zone C, at least when used in conjunction with elemental Al and Si powders.

It was found that tantalum without titanium increased the propensity of the coatings to crack, probably due to the mismatch in atomic size between Ta and Si causing strain in the microstructure of the surface zone where Ta had concentrated. However, when Ti and Ta were used together, the silicide rich zones became wider than those of normal SermaLoy J, tending to be less prone to crack initiation.

The chemical differences produced in zone C by Ta and Ti, relative to SermaLoy J, relate to their ability to form silicides, to go into solid solution with chromium silicide to produce complex silicides, and their affinity for nickel from the substrate to form intermetallic compounds such as $Ni_3Ti$. In addition, both aid formation of protective alumina scale at the surface of the coating during service, since they help to liberate Al from the aluminide phase. Although $TiO_2$ is not very protective by itself, it may aid coherence of the alumina scale. Tantalum also forms a dense stable oxide in use which is protective.

Figure 21A:
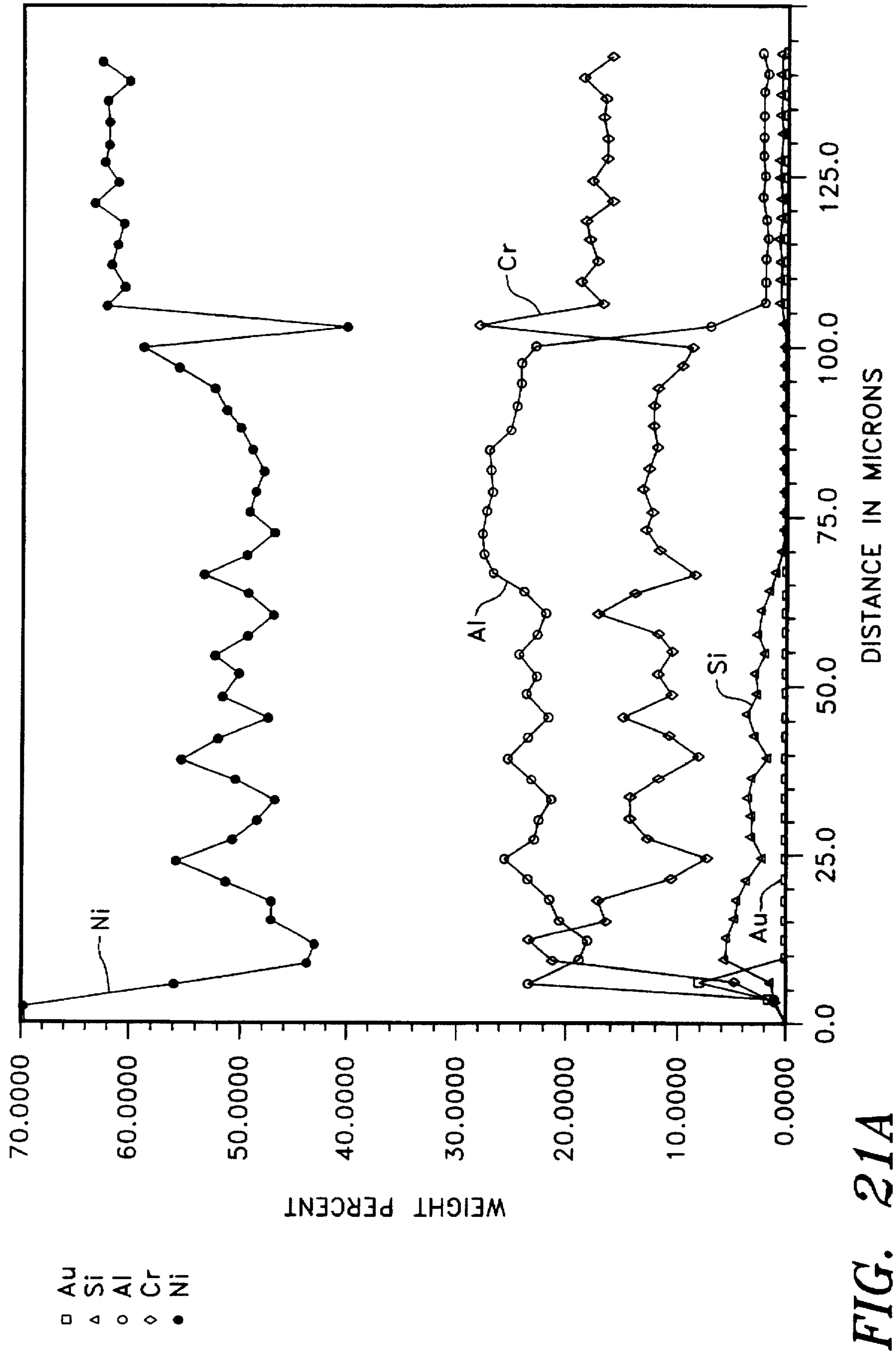
Figure 21B:
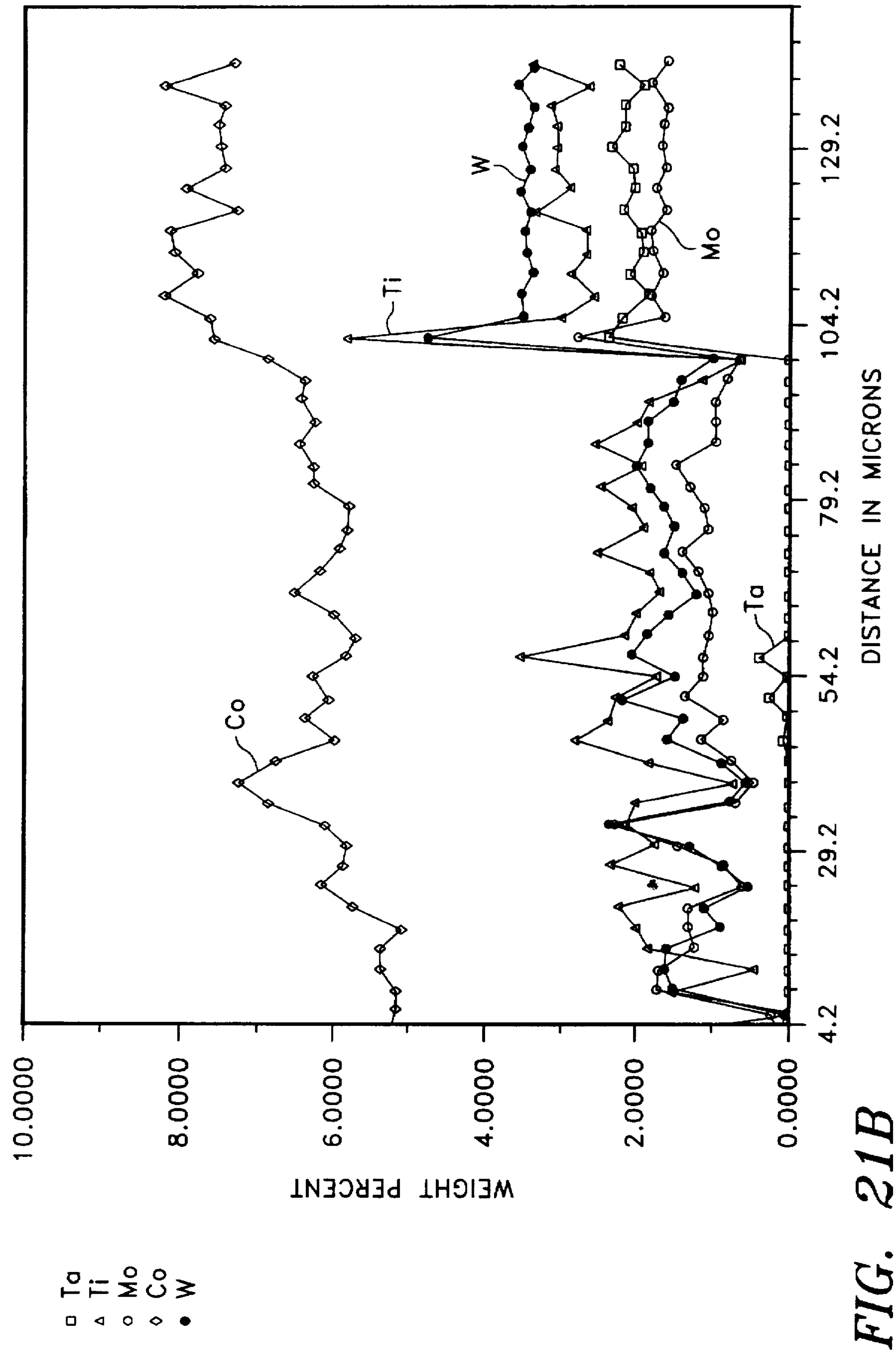

When slurries were tested containing eutectic Al—Si alloy as well as Ta and Ti, it was found that the Ta and Ti constituents were more evenly dispersed in the coating than noted above for elemental Si and Al powders. This is evident from the comparison of the distribution of Ti and Ta (particularly Ti) in the outermost layers of coating 1A15 (a composition incorporating eutectic powders with Ti and Ta) as shown in FIG. 21B with the distribution of those elements in the standard SermaLoy J (FIG. 14B). This observation confirms the effect noted under (ii) below, concerning more even distribution of silicides within the coating when eutectic Al—Si powders are used.

(ii) Use of Eutectic Al/Si Alloy Powder in Slurry

Figure 6:
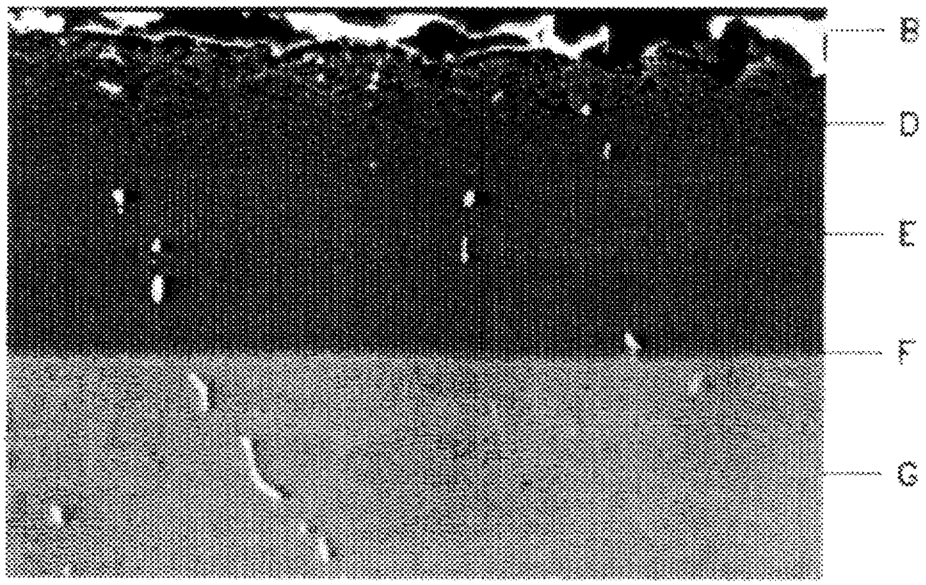

FIG. 6 is a scanning electron micrograph of coating sample 1A9, in which metallic content of the coating as applied and cured consisted entirely of powdered aluminum-silicon alloy of eutectic composition. Diffusion heat treatment was the same as normally used for SermaLoy J. FIG. 6 should be viewed in conjunction with FIG. 20, which shows the result of the corresponding EPMA.

The coating is approximately 85 μm deep, about 35 μm (70%) deeper than that of FIG. 4. Zone F is flat and fine grained, as in FIG. 4, leading to good mechanical properties at the interface.

Unlike in FIG. 4, zone C in FIG. 6 is very thin and patchy, and has not been counted as part of the total thickness of the coating, but zone D comprises approximately the outer 40% of the coating thickness, about 35 μm. Furthermore, the layering in zone D is not so discontinuous as for the same zone in FIG. 4.

Zone E in FIG. 6 is about 20 μm thicker than the same zone in FIG. 4, but takes up about the same proportion of the total coating thickness.

Figure 20A:
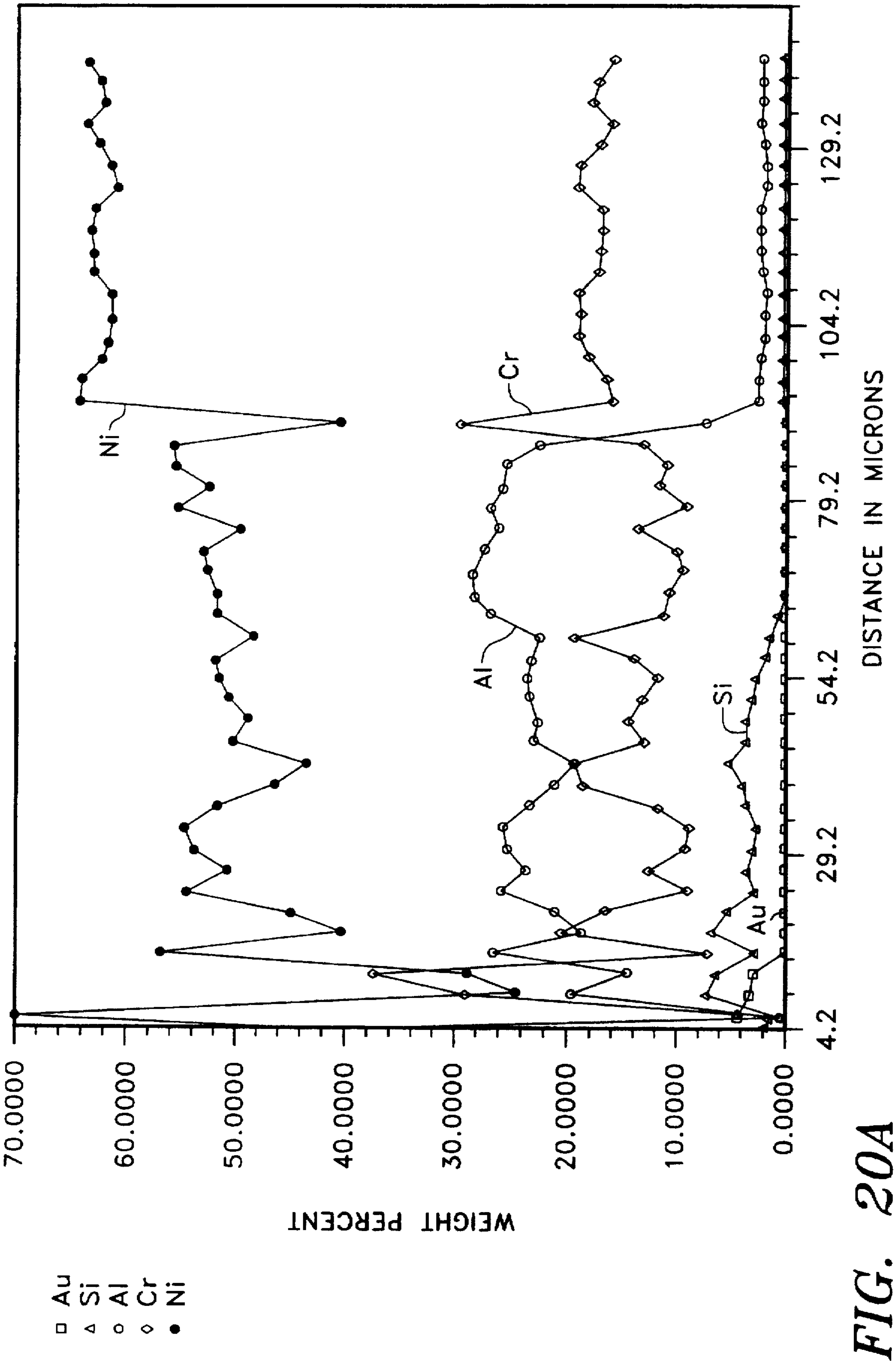
Figure 20B:
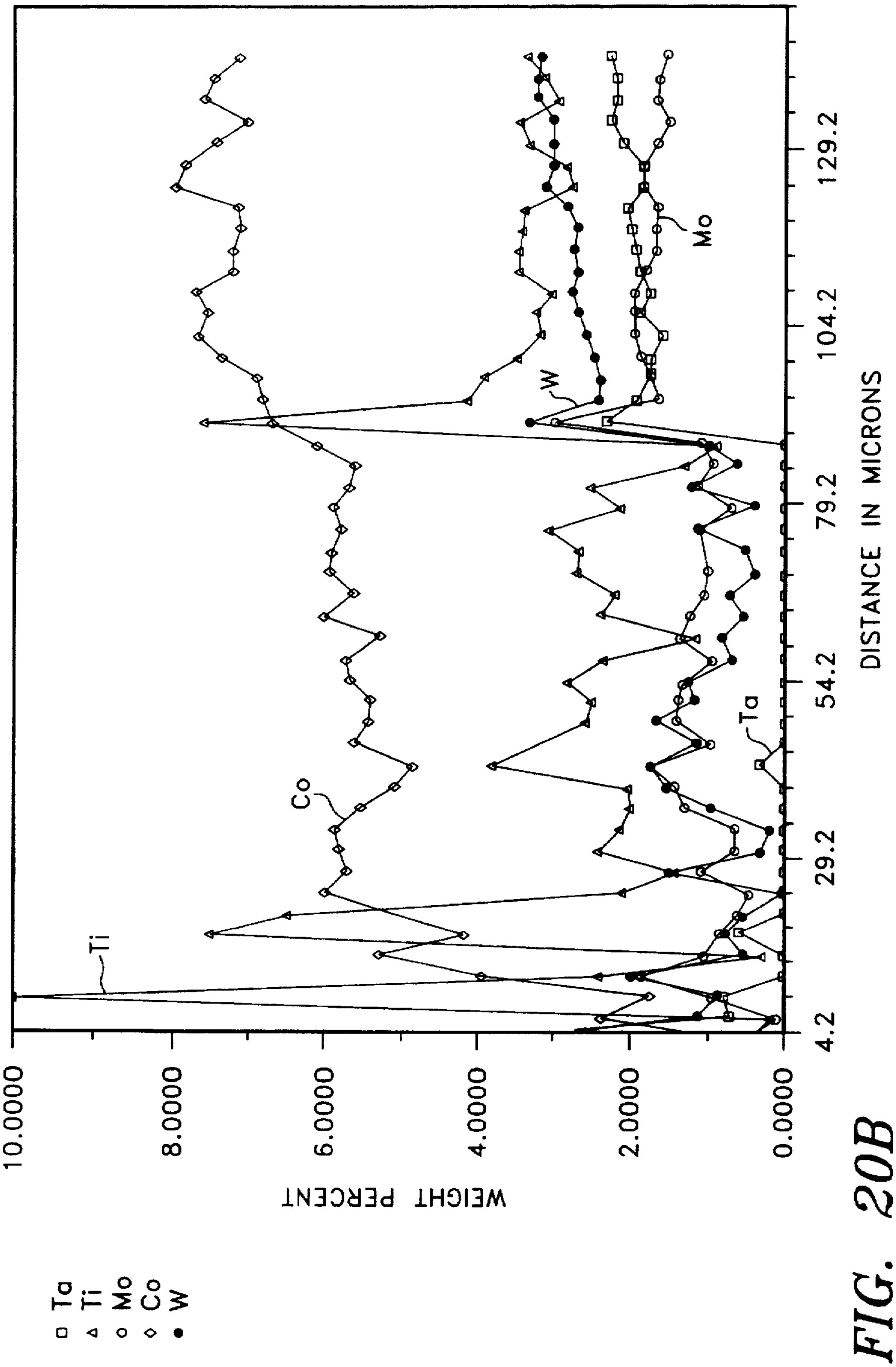

It will be noted from FIG. 20 that Si in sample 1A9 is more evenly spread through the coating than for sample J, with measured concentration nowhere exceeding about 8%.

When subject to visual microscopic inspection, no cracks were evident in the coating.

Sample 9U (see FIG. 7A) was diffused at a slightly higher temperature than samples J and 1A9, though still normal for SermaLoy J coating production. It incorporated about 69 wt. % of eutectic Al—Si powder, with elemental additions of aluminum and silicon and about 3 wt. % chromium.

Total coating thickness is only 20% greater than in FIG. 4, with zone C being somewhat more pronounced than in FIG. 6, but patchier than FIG. 4. Though zone D for sample 9U is still thicker than for sample J, the difference is not pronounced. It is evident that some of the silicide content which had been spread as layers through zone D in FIG. 6 [coating 1A9] has segregated to the surface zone C in FIGS. 7A [coating 9U, eutectic+Cr powder].

Figure 7A:
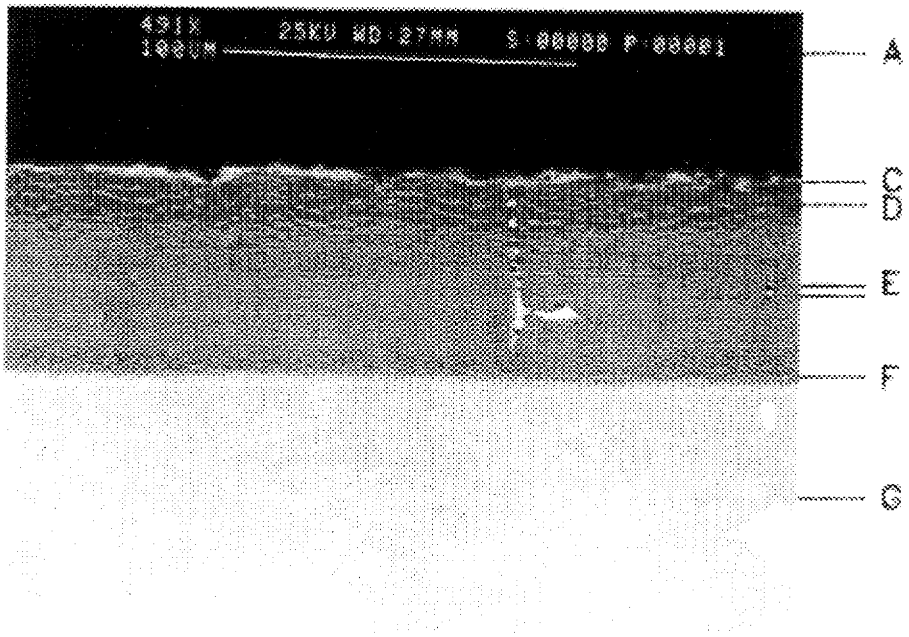
Figure 7B:
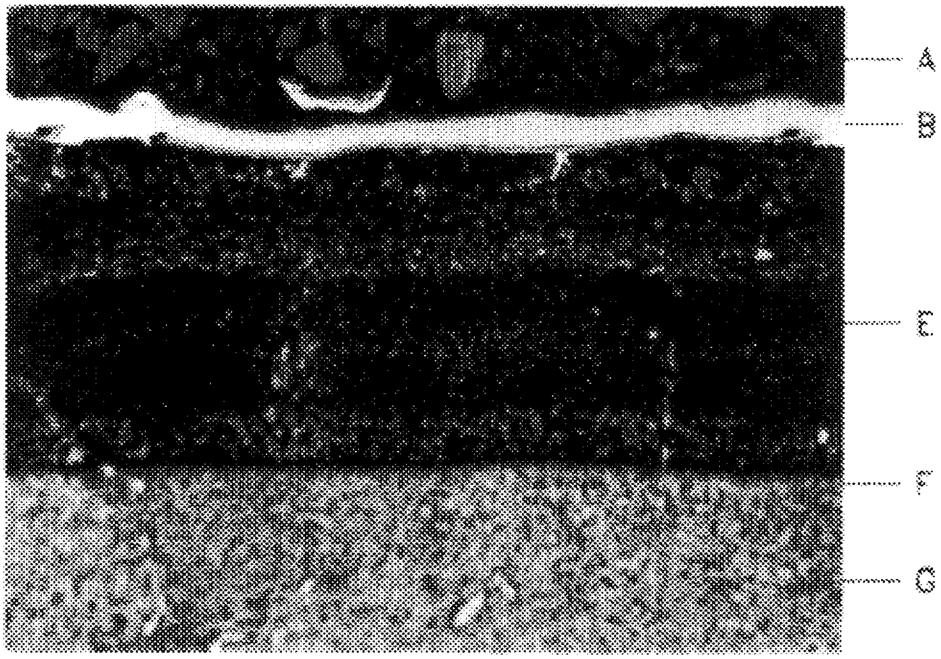

Adding Ti and Ta powder to the eutectic Al/Si alloy powder and chromium powder in slurry 1 A15 produced an aluminide with a more homogeneous microstructure than either of the eutectic alloy slurries that did not contain those constituents. None of the layering of silicon-rich phases seen in coating 1A9 (zone D in FIG. 6) is visible in the outer zone of the 1A15 aluminide (FIG. 7B). These silicides instead are uniformly distributed within the nickel aluminide in that zone. Though microprobe analysis in FIGS. 21A and B showed there was a similar amount of silicon in 1A15 (up to about 6%) as in the other coatings, FIG. 21A shows that this silicon was quite evenly spread through the outer zone. This is unlike the structure of coating 1A9, FIG. 20. In that coating, formed by diffusion of eutectic Al/Si alloy without additions of Cr, Ti or Ta, silicon concentrations in the outer layers were more variable.

Moreover, in FIG. 21, it is seen that Cr, Ti and Ta are quite uniformly distributed throughout the coating. When Cr was added to the eutectic slurry without Ti and Ta (coating 9U, FIG. 7A), the chromium silicides remained visibly concentrated in the outer zones C and D.

This evidence showed that Ti and Ta metal added to the slurries is incorporated into the aluminide produced when these slurries are diffused. These additions distribute Si and Cr more widely throughout the coating than is possible without the additions, compounding and amplifying the homogenizing influence of the eutectic Al/Si alloy powder.

Overall conclusions drawn from examination of other samples were in agreement with the above observations. It was found in accordance with the invention that the slurries containing Al—Si alloy of eutectic composition produced thicker coatings than slurries containing elemental Al and Si powders. It was apparent that some of the silicides which were particularly concentrated near the surface in normal SermaLoy J, have been more evenly distributed through the coating thickness.

(iii) Adding Al or Si to the Slurry

Examination of the samples showed that addition of extra silicon to the slurry promoted silicide rich outer zones which were thicker but with less Si content than those found with normal SermaLoy J. This is illustrated in the case of the coating sample 1A6, referred to in FIGS. 5 and 18, described above.

(iv) Adding Boron to the Slurry

Difficulty was experienced in assessing the effect that boron had on the coatings, due to limitations of the EPMA technique used. An effect of inclusion of boron as an optional constituent of coatings according to the invention is that it is likely to cause at least the aluminide phases of the coating to be more ductile. Since it is a melting point depressant, minor amounts are preferably used for beneficial effect on the coating in a high temperature environment.

(v) Changing the Diffusion Heat Treatment Temperature

On nickel base alloys, the silicon-aluminum slurries must be diffused above about 854° C., preferably at 870°–885° C., to form an aluminum-rich NiAl phase without formation of the brittle stoichiometric $NiAl_3$ phase. This critical temperature was confirmed in this study when the diffusion temperature was lowered to 760° C. in an effort to reduce the rate of diffusion of Al and consequently increase Al concentration (i.e., reduce Si concentration) in the outer zone of these coatings. In that case, thinner coatings were produced and their Al levels were too high. Not surprisingly, it was found that cracking was more severe on samples diffused at 760° C. than those diffused at 870°–885° C.

Diffusing at temperatures about 1000° C. produced coatings which were thicker and more ductile than those produced at 870° C. with a better dispersion of silicon-rich phases in the coating.

When diffusion at 1000° C. and above was combined with additions of chromium to the slurry, a favorable combination of effects occurred and such samples were particularly resistant to formation of cracks.

Diffusing at 870° C. to 885° C. (normal diffusion temperatures) enables what can be termed a high activity aluminizing process, in which aluminum inward diffusion is the main reaction.

At 1120° C., the outward diffusion of heavy elements, particularly nickel in a nickel base material, becomes more prominent, resulting in a low activity aluminide process. As nickel moves into the coating it leaves other elements, which are normally in solid solution with nickel in the substrate, to precipitate out as columnar carbides in the diffusion interface zone. Some samples, such as 1B9, see FIG. 8, and 1B18, see FIGS. 9 and 22, were therefore subjected first to normal diffusion temperatures for two hours and then to increased diffusion temperatures for a further two hours in order to exploit the high/low activity aluminide characteristics.

Examination of the samples showed that increasing diffusion temperature to 1120° C. always produced an interface diffusion zone F containing columnar carbides. Compared with sample J and some others, lower Al concentrations were achieved in the body of the coating and lower Si content in the outer zone. This can be seen in FIGS. 9 and 22.

Figure 8:
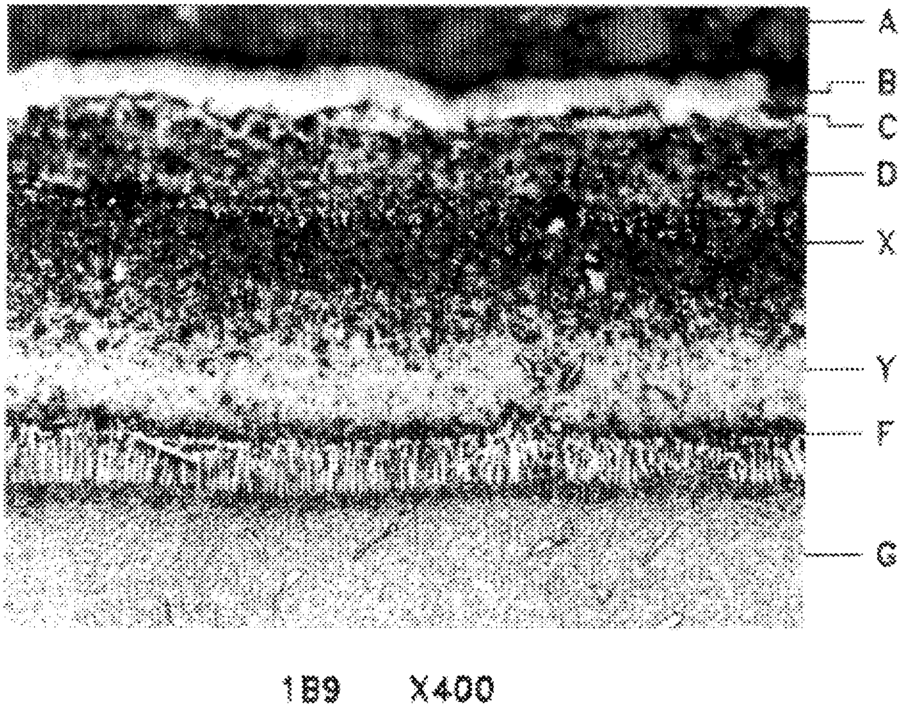

Sample 1B9 in FIG. 8 shows the result of high temperature diffusion of a slurry whose metallic powder content is 100 wt. % eutectic Al—Si alloy. Most notable is the greatly increased total thickness of the coating, 130% greater than sample J, resulting from the previously noted thickening effect of the eutectic alloy added to the increased diffusion temperature. Unlike sample 1A9 comprising eutectic alloy powder, but diffused at lower temperature, a pronounced 5 μm-thick Si-rich surface zone C is apparent, probably due to greater inward diffusion of aluminum. However, a thick layering zone has been formed, as in 1A9, and good precipitate formation throughout the underlying zones is likewise evident.

Figure 9:
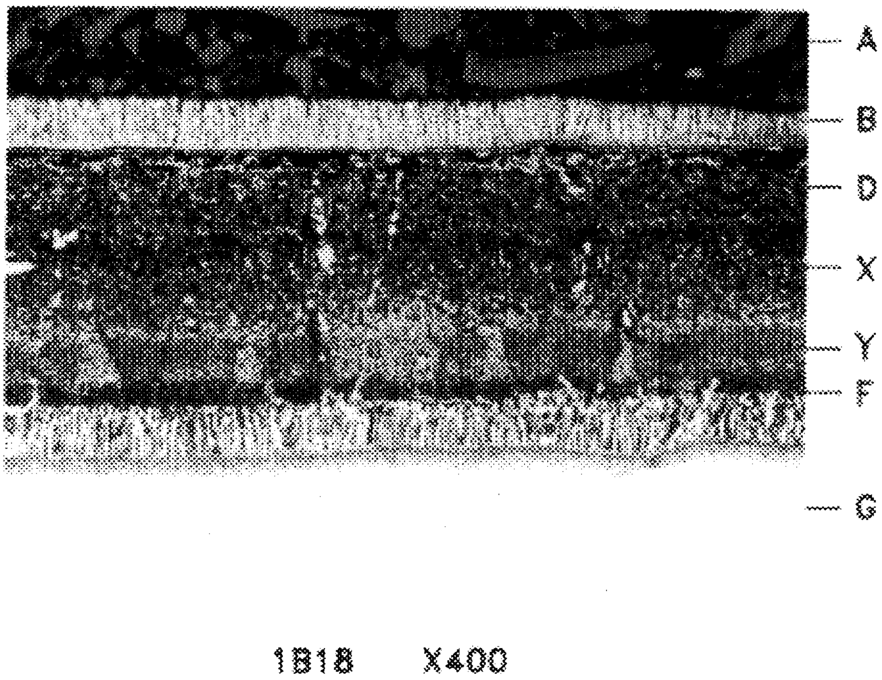
Figure 22:
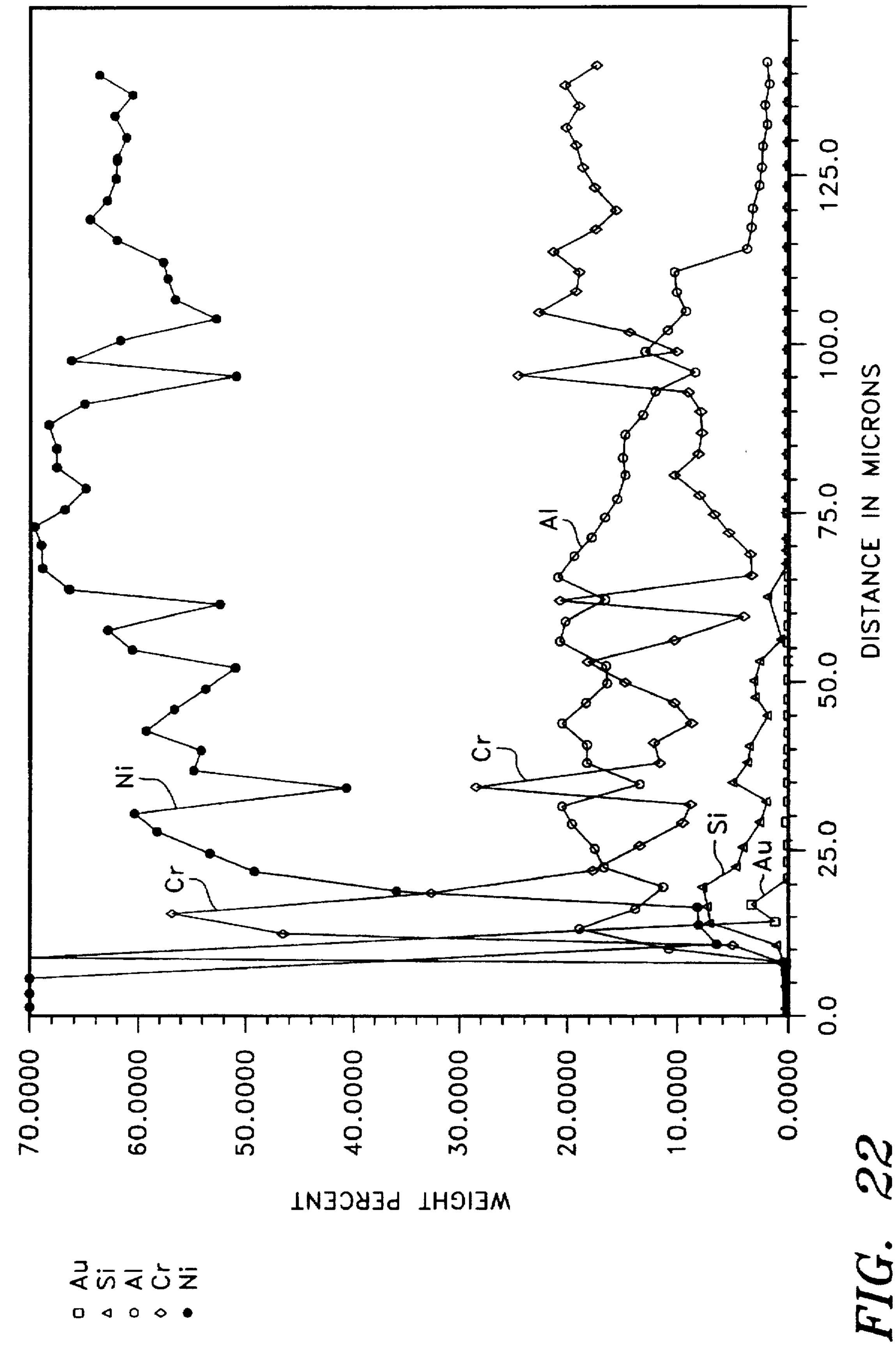

FIGS. 9 and 22 also show features resulting from the combination of two different coating modifying changes, namely, use of an amount of additional strong suicide former in the slurry mix (+10 wt. % Cr) and increased diffusion temperature, i.e. 1120° C. The microstructure shows a patchy zone C and a thicker layering zone D, despite the fact that the overall thickness of the coating is somewhat less than for sample 1B9 in FIG. 8. Cr appears to have been effective at encouraging silicide formation within zones D,X, and Y at the expense of zone C.

The high diffusion temperature, as explained above, has modified zone F relative to sample J. Migration of the heavier (refractory) elements in the IN738 base material, i.e., Mo, W, Ti, Cr, Ta and Nb, has been encouraged, along with the carbon already present in the alloy. These refractory elements are strong carbide formers, and consequently their movement through the coating is arrested by the carbide formation at the interface. This is advantageous because their oxides tend to be deleterious to the protective properties of the coating's surface scale which is formed in service, so they should be kept away from the surface if possible.

One problem in adopting a high temperature diffusion heat treatment at 1120° C. is that it is deleterious to the mechanical properties of IN-738 and other superalloys because it puts the strengthening grain boundary precipitates produced during the normal precipitation heat treatment back into solid solution. However, the correct structure can be restored by giving the coated alloy a further precipitation heat treatment. For IN-738 this is 24 hours at 840° C.

(vi) Changing Time of Diffusion Heat Treatment

Increasing time at the normal diffusion temperature of 870° C. to 885° C. tended to reduce cracking in the samples. Increased diffusion heat treatment time also produced somewhat thicker coatings, but the effect was not so pronounced as it was for increased temperature.

Overall, little change in coating structure was apparent, tending to show that the times used for SermaLoy J production, i.e. 2 hours, are sufficient to produce an adequately diffused coating.

Corrosion Tests

Accelerated hot corrosion rig testing was undertaken on samples of IN738 pins 6.5 mm dia×65 mm long, covering various aspects of the above described coating and process variations.

Prior to application of coating slurry, the samples were degreased in hot vapor of 1,1,1 trichloroethane, then blasted with 90/120 mesh alumina grit at 20 psi or 138 kPa.

A thin wet coat of each slurry was applied to the blasted samples using a conventional air atomizing spray gun. After allowing the water to evaporate, the sprayed slurry coat was dried at 80° C. (175° F.) for at least 15 minutes, then cured for 30 minutes at 350° C. (660° F.).

When the samples had cooled, the coating thickness was built up by applying and curing further slurry coats following the procedure previously outlined in respect of the disc samples.

Each of the coated samples was then subjected to a diffusion heat treatment schedule involving diffusion at 885° C. for 2 hours. When the samples had cooled after heat treatment, undiffused residues were removed by lightly blasting with −140 +220 glass beads at 20 psi (138 kPa) in a suction blaster.

In the hot corrosion tests, pins were heated for three minutes in an open flame fueled by propane, achieving a steady state temperature of 950° C.(1740° F.) within about 60 seconds. Then the hot pins were quenched to room temperature within 60 seconds in a fine atomized spray of an aqueous solution containing 1 wt. % $Na_2SO_4$ and 10 wt. % NaCl. After three minutes in the spray, the complete heating and quenching cycle was repeated and this was continued for a total of about 140 hours. About every seven or eight hours the test was interrupted and the pins were removed, ultrasonically cleaned in de-ionized water, weighed and examined by eye. Any pins exhibiting distress were removed and substituted with bare pins to keep the mass identical at all times.

Three different tests were performed, utilizing four or five different coating samples in each test, with each different coating sample being utilized on three pins, making 12 to 15 pins in each test. Three of the pins in each test were coated with normal SermaLoy J.

Figure 23:
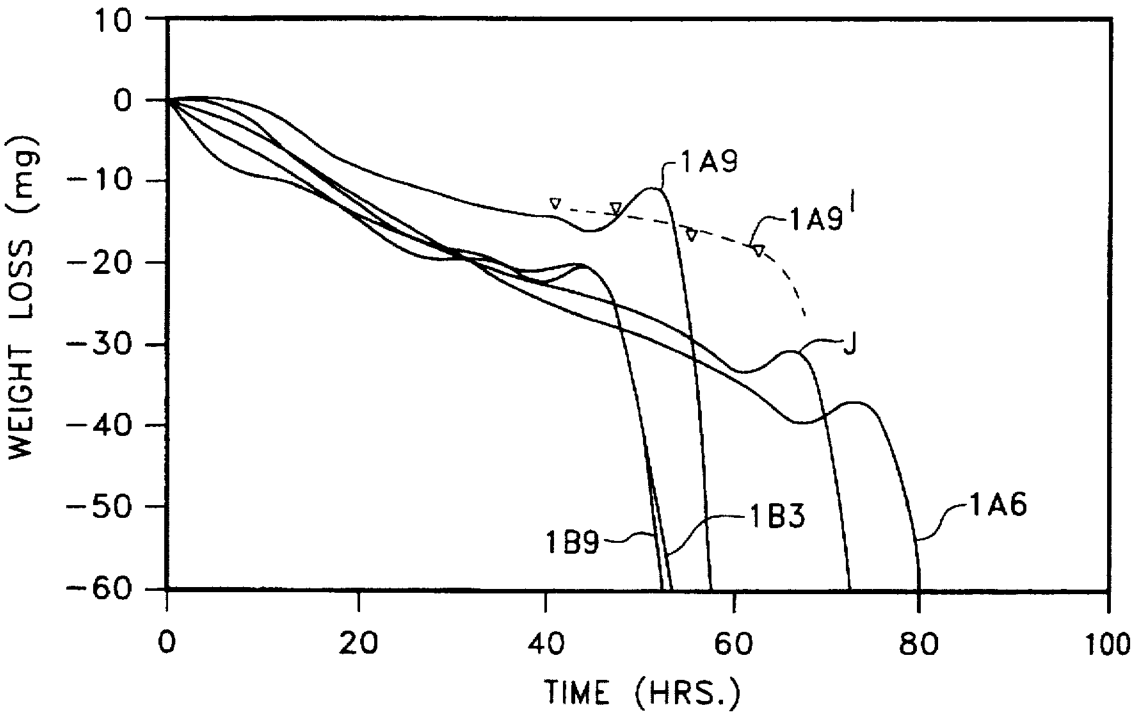
FIGS. 23 to 25 are graphs showing the result of accelerated hot corrosion testing of test pieces coated with various of the aluminide-silicide coatings which were investigated, with weight loss in milligrams plotted against time of test in hours.

The results of this testing are illustrated in FIGS. 23 (15 pins), 24 (12 pins) and 25 (15 pins), which are graphs showing weight loss in milligrams, plotted against time of test in hours. On the graphs, the solid lines labelled as relating to the different types of coating sample are only an indication of the average loss of weight for each pin and therefore disguise individual pin results, which will be discussed below. Graph lines for pins coated in normal SermaLoy J are labelled "J".

Two of the coating samples in FIG. 23 are worthy of particular note.

Three pins for coating sample 1A9 were tested, having the coating composition shown in Table 1. For about the first 40 hours of the test, samples 1A9 clearly lost weight at a lesser rate than the other samples, including the SermaLoy J test pieces. After 40 to 50 hours, two of the 1A9 samples rapidly deteriorated, though one, labelled 1A9' on the graph, continued better than all the other samples until after 60 hours had been completed.

The other notable coating sample in FIG. 23 is number 1A6, again comprising three pins, which outlasted the SermaLoy J coated pins. As will be seen from Table 1, this coating sample, described above in relation to FIGS. 5 and 18, comprised elemental Si and Al powders, with 5 wt. % Cr and 10 wt. % Si added at the expense of the usual Al content for normal SermaLoy J. The better performance is probably due to the presence of a thick silicide-rich surface layer C resulting from the extra silicon and the addition of chromium as a strong silicide former.

Samples 1B3 and 1B9, which had been subjected to the high temperature diffusion heat treatment (see Table 1), did not give optimum performance. The decrease in hot corrosion resistance is believed to be due to depletion of the coatings, aluminum content by its migration into the substrate material during the high temperature treatment.

Nevertheless, for usage conditions in which hot corrosion is not such a serious problem, the thicker, more ductile coating and the better dispersion of the silicides therein typified by these samples may be attractive enough advantages of the high temperature treatment, especially when combined with addition of silicide formers to the slurry.

Figure 24:
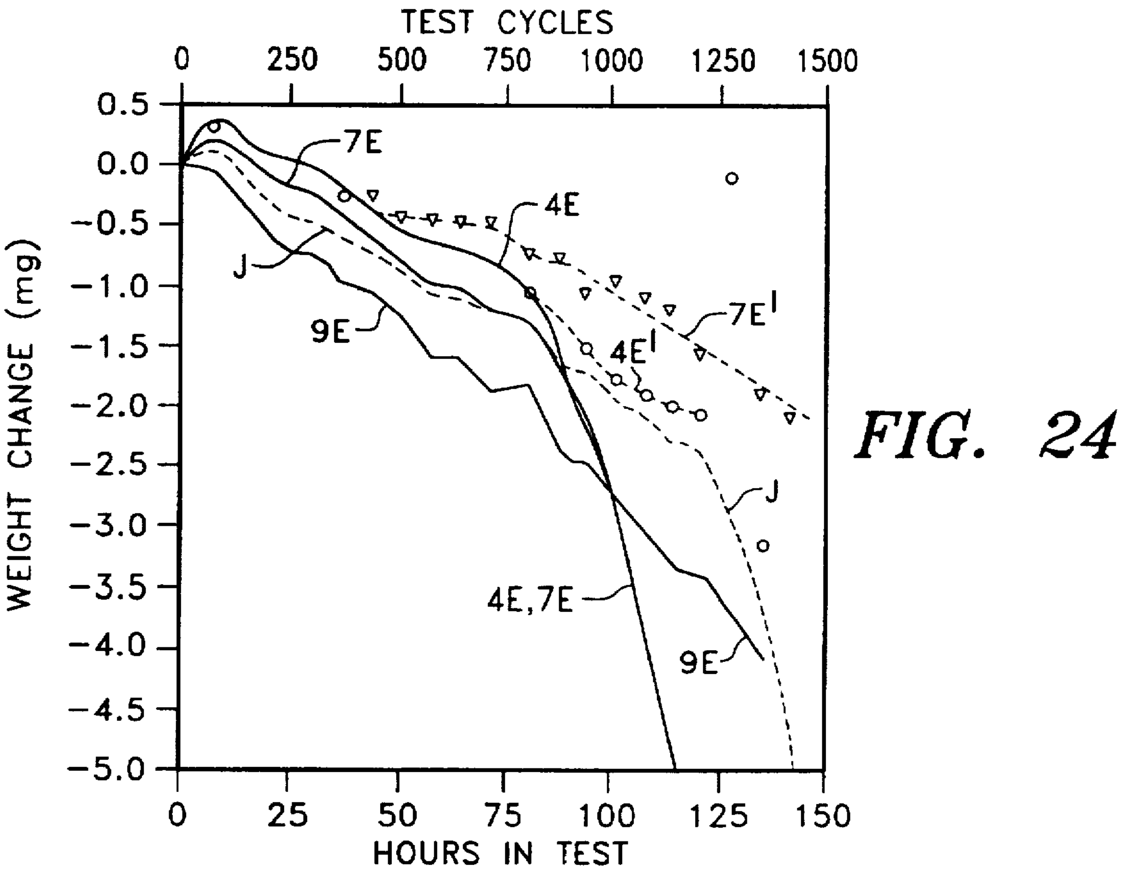

Turning now to FIG. 24, the performance of samples 7E, 4E and 9E is noteworthy. Although on average, the 4E and 7E pins lost weight at a greater rate than SermaLoy J after about 75 hours, their weight loss previously had been less than that of the SermaLoy J samples. Furthermore, one of the 7E pins, indicated by 7E' in the graph, consistently showed a much lower rate of weight loss after 75 hours than the SermaLoy J samples, and finished the test with a good thickness of coating remaining, whereas the three SermaLoy J samples had been destroyed.

It should also be noted that, after 75 hours, one of the 4E pins lost weight at an appreciably lower rate than the SermaLoy J pins, until about 120 hours had been reached. This pin is indicated by 4E' on the graph.

The fact that most 4E and 7E pins did not perform so well as 4E and 7E may be due to the added heavy chromium powder in the coating slurry making it more difficult to apply evenly over the pin surfaces during preparation.

Regarding coating sample 9E, it is important to notice that though in the earlier stages of the test the pins seemed to perform less well than the others, their performance was more consistent and at the end of the test they had not suffered the rapid loss of remaining coating characterizing the SermaLoy J coating samples. There was still some coating thickness available in all the 9E pins at the end of the test.

Figure 25:
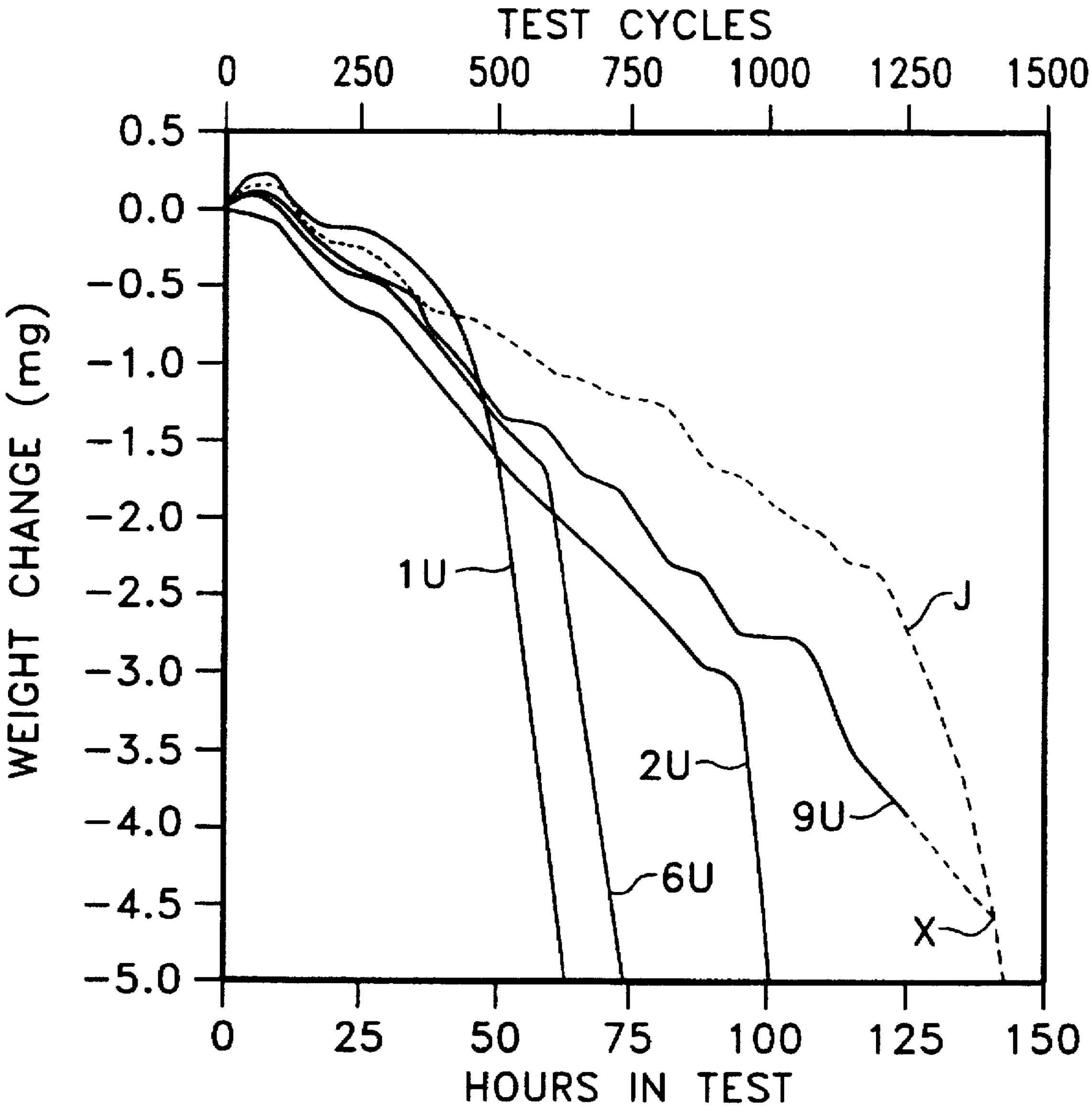
Figure 26:
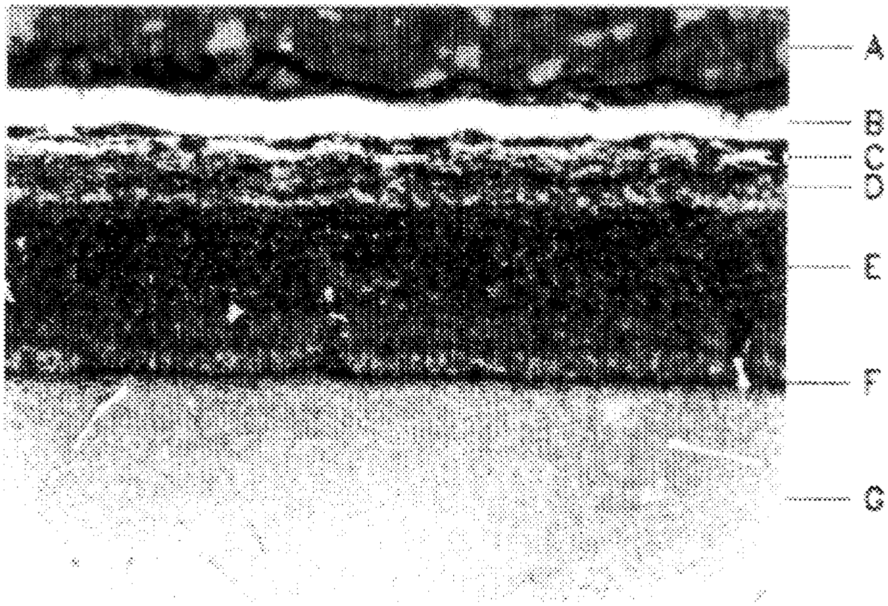
FIGS. 26 through 30 are photomicrographs of various coating samples.
Figure 27:
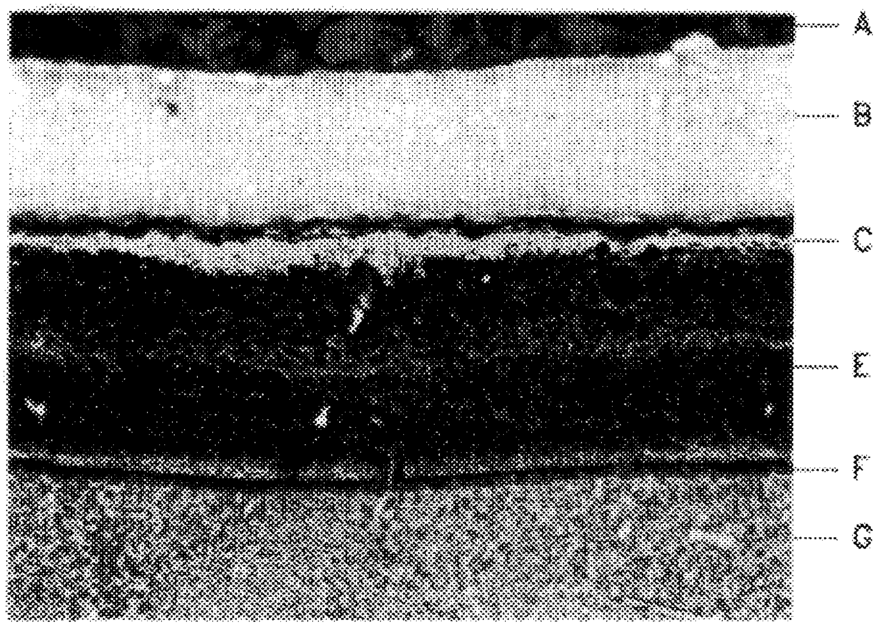
Figure 28:
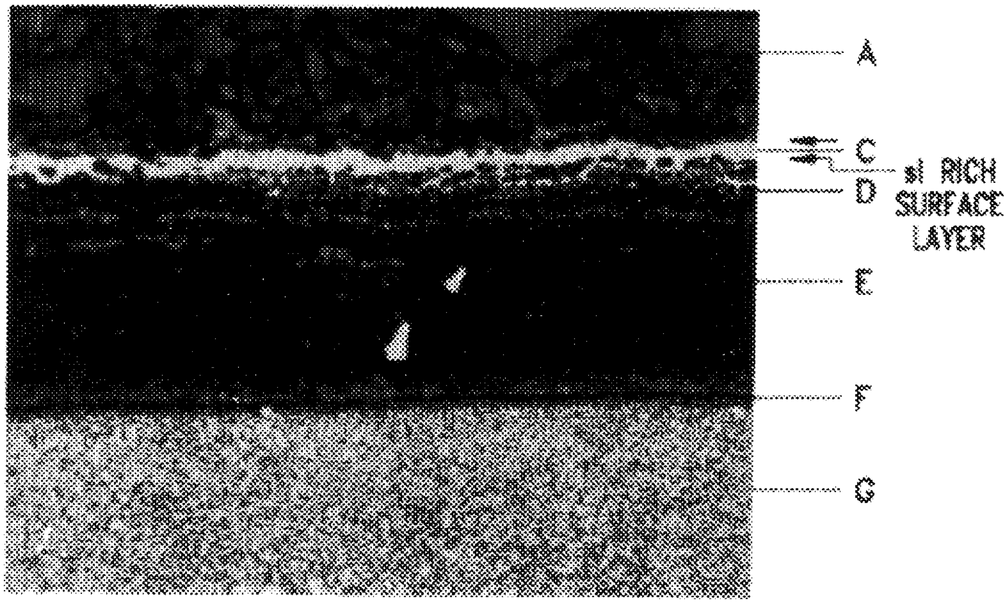
Figure 29:
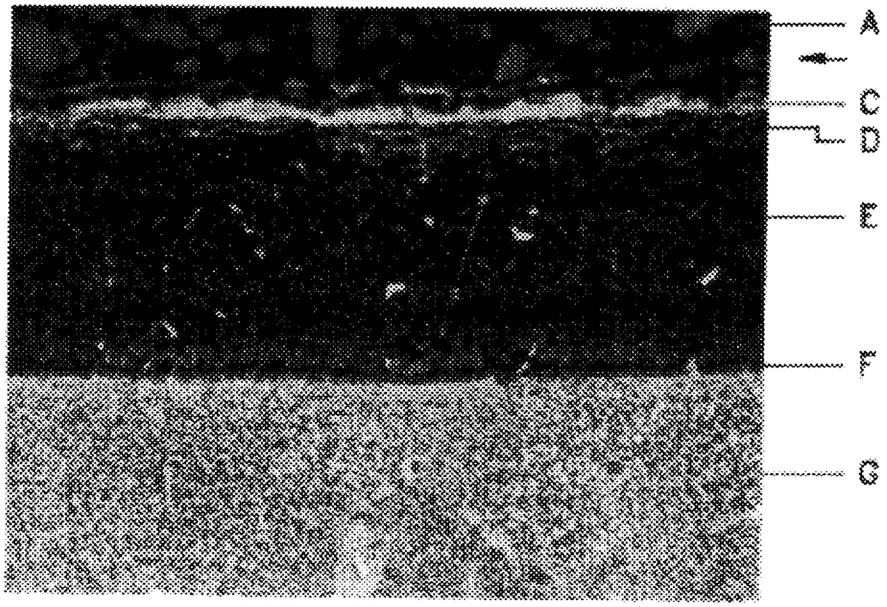
Figure 30:
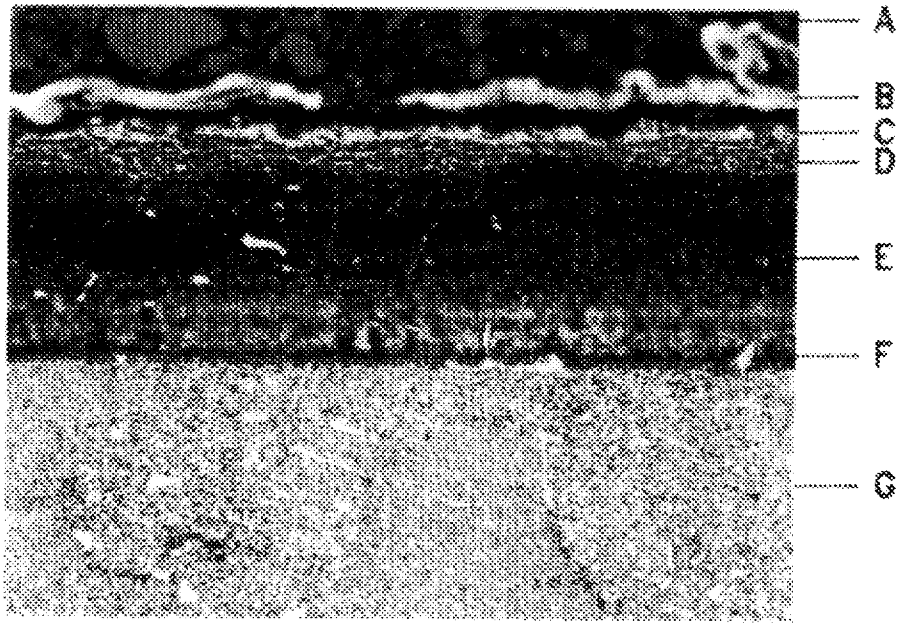

Looking now at FIG. 25, the test results for three coating samples 9U (Table 1) are compared with three SermaLoy J samples, and also three samples each of three other coatings designated 1U, 2U and 6U, not shown in Table 1. All these samples included eutectic Al—Si alloy powder in the coating slurry.

Coating 1U served as a kind of negative standard to test the presuppositions of the test strategy. The slurry contained, as a proportion of metal pigment content, 20 wt. % chromium, with Si and Al contents of only 5 wt. % and 75 wt. % respectively, part of the aluminum and silicon content being elemental powders, and part being eutectic alloy powder. The aluminide produced by this slurry seemed to be quite ductile but lacked any of the microstructural features thought necessary for good resistance to hot corrosion. Pins coated with this composition failed quickly. See FIG. 25.

Coating 2U contained no chromium, with Si and Al contents of 25 wt. % and 75 wt. % respectively. As before, part of the aluminum and silicon content was in the form of elemental powders, and part was eutectic alloy powder.

Coating 6U also contained no chromium, but Si and Al contents were 15 wt. % and 85 wt. % respectively. Therefore, with respect to total Al and Si content, it was like a standard SermaLoy J slurry, but again, part of the aluminum and silicon content was in the form of elemental powders, and part was eutectic alloy powder.

All the 2U and 6U pins failed well before the SermaLoy J samples, but at 140 hours the three 9U pins still had coatings, whereas the three SermaLoy J pins had failed, indicated by the crossover point X of the J and 9U lines on the graph.

The final overall ranking of the best coating samples for weight loss during the hot corrosion tests was as follows, starting with least weight loss: 9E, J, 9U, 4E and 7E.

A pin coated with coating sample 9E gives coating of improved performance. When a coating of sample 9U is applied to a rotor blade of a gas turbine engine, a comparable improved coating resulted. Likewise, a coating on an airfoil with sample 1A6 gives a coating with a thick surface layer of reduced silicon content and improved performance.

Other turbine parts like vanes, discs, burner cans, after burners, thrust reversers, shafts and accessories therefore like fasteners, bolts, etc., benefit from the coatings of the invention noticeably.

A fastener coated with coating sample 9U gives a coating of improved performance.

The coatings of the invention are not limited to gas turbines but include coating any superalloy coated part exposed to the operating conditions to which it is normally exposed in use like reciprocating engines, space vehicles (aerodynamically, like heated skins), steam power engines and the like.

The above reported investigations were carried out with samples comprising IN-738 nickel based superalloy. Cobalt based superalloys and austenitic stainless steel superalloys when coated with the coatings of the invention likewise give comparable improved coatings.

Hot corrosion resistance with resistance to the inception of crack formation in the coating on superalloys is a serious problem facing the industry. The problem becomes increasing serious as conditions of use become more demanding. The present invention makes a contribution to solving this problem in this field.

We claim:

1. An aluminide-silicide coating on a heat-resistant superalloy substrate, the coating having a highly dispersed distribution of silicide phases throughout the coating's thickness, the coating having resistance to developing cracks and resistance to oxidation and hot corrosion conditions, the coating comprising a layer which comprises a continum of silicide and aluminide phases and a predominantly aluminide layer below and adjacent said layer, the coating being formed from a slurry comprising aluminum, silicon and a powder of a silicide-forming metal in an amount effective to promote the formation and dispersion in the coating of silicides corresponding to the metal.

2. The coating of claim 1 which further comprises a silicon surface layer above and adjacent to the continuum layer and which surface layer has an increased silicon content relative to the continuum layer.

3. The aluminide-silicide coating of claim 2, wherein the surface layer contains a maximum of about 25 wt % of silicon.

4. The aluminide-silicide coating of claim 3 which comprises chromium.

5. The aluminide-silicide coating of claim 4 wherein the chromium does not exceed about 10 wt %.

6. The aluminide-silicide coating of claim 3 wherein the aluminum in the aluminide layer is in the range of about 15 to 25 wt % and does not vary throughout the coating by more than about 12 wt %.

7. the aluminide-silicide coating of claim 6 which also comprises both Ti and Ta contained in the surface layer.

8. The aluminide-silicide coating of claim 2 wherein the layer below and adjacent the surface layer is a zone of interleaved layers of aluminum and silicide phases.

9. The aluminide-silicide coating of claim 8 wherein the zone of interleaved layers is at least about 12 microns thick.

10. The coating of claim 8, in which the aluminum content of the coating varies by not more than about 8 wt. %.

11. The aluminide-silicide coating of claim 2 wherein the layer below and adjacent to the surface layer is a layering layer which comprises a substantially continuous interleaved layer of aluminide and silicide phases which layer is at least about four times the thickness of the surface layer.

12. The aluminide-silicide coating of claim 11 wherein the layering layer is at least ten times the thickness of the surface layer.

13. The aluminide-silicide coating of claim 2 wherein the aluminum in the layer below the surface zone and in the aluminide layer is in the range of about 15 to about 30 wt %.

14. The aluminide-silicide coating of claim 13 wherein the aluminum is in the range of about 20 to about 30 wt %.

15. The aluminide-silicide coating of claim 13 wherein the aluminum content throughout the coating varies by no more than about 12 wt %.

16. The aluminide-silicide coating of claim 15 wherein the aluminum content throughout the coating varies by no more than about 8 wt %.

17. The aluminide-silicide coating of claim 13 wherein in the layer below the surface zone and in the aluminide layer, the aluminum and the silicon vary depthwise in about inverse proportion to each other.

18. The aluminide-silicide coating of claim 17 wherein the aluminum content of the coating does not exceed about 30 wt %.

19. The aluminide-silicide coating of claim 2 wherein the surface layer includes at least one of Ta or Ti in solid solution with chromium silicide.

20. The aluminide-silicide coating of claim 19 wherein the amount of Ta or Ti in the surface layer exceeds the weight percentage content of the substrate material.

21. The aluminide-silicide coating of claim 20 wherein Ti or Ta is evenly dispersed through the thickness of the coating.

22. The aluminide-silicide coating of claim 1 wherein the aluminide phase comprises silicide precipitates substantially evenly dispersed therein.

23. The aluminide-silicide coating of claim 1 wherein the continuum layer is a layer of interleaved layers of aluminide and silicide phases.

24. The coating of claim 1 wherein the slurry comprises chromium metal powder.

25. The coating of claim 24 wherein the slurry further comprises at least one of tantalum powder and titanium powder.

26. The coating of claim 1 wherein the slurry comprises at least one of tantalum powder and titanium powder.

27. The aluminum-silicide coating of claim 1 wherein the silicide-forming metal is selected from the group consisting of chromium, tantalum, and titanium.

28. The aluminide-silicide coating of claim 1 wherein the silicide-forming metal is selected from the group consisting of rhenium, zirconium, hafnium, and manganese.

29. The aluminum-silicide coating of claim 1 wherein the silicide-forming metal is selected from the group consisting of elements of Group 4b and 5b of the Periodic Table.

30. The superalloy turbine part coated with an aluminide-silicide coating which coating has highly dispersed silicide phases throughout the coating's thickness and which coating comprises a layering layer having substantially continuous interleaved layers of aluminide and silicide phases, and sandwiched between the layering layer and a diffusion interface of the coating with the substrate, a predominately aluminide layer having pronounced silicide precipitates, which coating is formed from a slurry comprising aluminum, silicon, and a powder of a silicide-forming metal in an amount effective to promote the formation and dispersion in the coating of silicides corresponding to the metal.

31. The coated part of claim 30 wherein the silicide-forming metal is selected from the group consisting of chromium, tantalum, and titanium.

32. The coated part of claim 30 wherein the silicide-forming metal is selected from the group consisting of rhenium, zirconium, hafnium, and manganese.

33. The coated part of claim 30 wherein the silicide-forming metal is selected from the group consisting of elements of Group 4b and 5b of the Periodic Table.

34. A diffusion heat treated aluminide-silicide coating structure for a heat resistant alloy substrate containing major proportions of at least one of Ni or Co, the coating having a plurality of zones in depthwise series, including a silicon-rich surface zone, a pronounced layering zone comprising interleaved layers of aluminide and silicide phases, and a predominantly aluminide zone with pronounced silicide precipitates, located between the layering zone and a diffusion interface of the coating with the substrate, wherein the surface zone is at least 2 microns thick and the layering zone is at least four times the thickness of the surface zone, subject to a minimum thickness for the layering zone of 12 microns, the coating being formed from a slurry comprising aluminum and silicon, and a powder of a silicide-forming metal in an amount effective to promote the formation and dispersion in the coating of silicides corresponding to the metal.

35. The coating structure of claim 34, wherein the layering zone is a least ten times the thickness of the silicon-rich surface zone.

36. The coating structure of claim 34 wherein the silicide-forming metal is selected from the group consisting of chromium, tantalum, and titanium.

37. The coating structure of claim 34 wherein the silicide-forming metal is selected from the group consisting of rhenium, zirconium, hafnium, and manganese.

38. The coating structure of claim 34 wherein the silicide-forming metal is selected from the group consisting of elements of Group 4b and 5b of the Periodic Table.

39. A diffusion heat treated aluminide-silicide coating structure for a heat resistant alloy substrate containing major proportions of at least one of Ni and Co, the coating having a plurality of zones in depthwise series, including a surface zone having a maximum silicon content of less than 25 wt. %, a layering zone comprising alternate layers of aluminide and silicide phases, and a predominantly aluminide zone with pronounced silicide precipitates, located between the layering zone and a diffusion interface of the coating with the substrate, wherein the aluminum content in the layering zone and the aluminide zone is consistently more than 15 wt. % and not more than 30 wt. %.

40. The coating of claim 39, in which the aluminum content of the coating varies by not more than about 12 wt. %.

41. A diffusion heat treated aluminide-silicide coating structure for a heat resistant alloy substrate containing major proportions of at least one of Ni and Co, the coating having a plurality of zones in depthwise series, including a surface zone having a maximum silicon content of less than 25 wt. %, a layering zone comprising alternate layers of aluminide and silicide phases, and a predominantly aluminide zone with pronounced silicide precipitates, located between the layering zone and a diffusion interface of the coating with the substrate, wherein in the layering aluminide zones the aluminum content is not more than 30 wt. % and the aluminum and silicon contents vary therein depthwise in approximately inverse proportion to each other.

42. A diffusion heat treated aluminide-silicide coating structure for a heat resistant alloy substrate containing major proportions of at least one of Ni and Co, and minor proportions of at least one of Ta and Ti, the coating having a plurality of zones in depthwise series, including a surface zone having a maximum silicon content of less than 25 wt. %, a layering zone comprising alternate layers of aluminide and silicide phases, and a predominantly aluminide zone with pronounced silicide precipitates, located between the layering zone and a diffusion interface of the coating with the substrate, wherein the surface zone includes at least one of Ta and Ti in amounts greater than the weight percentage content of the substrate material.

43. A superalloy turbine part having improved resistance to oxidation and to hot corrosion, which part is coated with an aluminide-silicide coating which coating has highly dispersed silicide phases throughout the coating's thickness and which coating comprises an outer layer which comprises silicon-rich and aluminum-rich phases and a predominantly aluminide layer below and adjacent said outer layer which contains pronounced silicide precipitates, the coating being formed from a slurry comprising aluminide and silicon, and a powder of a silicide-forming metal in an amount effective to promote the formation and dispersion in the coating of silicides corresponding to the metal.

44. The coated superalloy turbine part of claim 43 wherein the outer layer is substantially continuous.

45. The coated superalloy turbine part of claim 44 wherein the outer layer is a layer of interleaved alternate layers of aluminide and silicide phases.

46. The coated superalloy turbine part of claim 44 wherein the silicide concentration in the coating does not exceed 8% in any one location.

47. The coated superalloy turbine part of claim 43 wherein the silicide-forming metal is selected from the group consisting of chromium, tantalum, and titanium.

48. The coated superalloy turbine part of claim 43 wherein the silicide-forming metal is selected from the group consisting of rhenium, zirconium, hafnium, and manganese.

49. The coated superalloy turbine part of claim 43 wherein the silicide-forming metal is selected from the group consisting of elements of Group 4b and 5b of the Periodic Table.

50. A diffusion heat treated aluminide-silicide coating structure for a heat resistant alloy substrate containing major proportions of at least one of Ni and Co, the coating having a plurality of zones in depthwise series, including a surface zone having a maximum silicon content of less than 25 wt %, a layering zone comprising alternate layers of aluminide and silicide phases, and a predominantly aluminide zone with pronounced silicide precipitates, located between the layering zone and a diffusion interface of the coating with the substrate, wherein the surface zone includes at least one of Ta and Ti in amounts greater than the weight percentage content of the substrate material.

51. The coating of claim 50 wherein the titanium or tantalum is present in the coating as silicide phases.

52. The coating of claim 51 which further comprises chromium silicide phases.

53. A superalloy part coated with an aluminide-silicide coating having a highly dispersed distribution of silicide phases throughout the coating, the coating comprising a layer which comprises a continuum of silicide and aluminide phases and a predominantly aluminide layer below and adjacent said layer, the coating being formed from a slurry comprising aluminum and silicon, and a powder of a silicide-forming metal in an amount effective to promote the formation and dispersion in the coating of silicides corresponding to the metal.

54. The coated part of claim 53 wherein the coating further comprises a silicon surface layer above and adjacent to the continuum layer which surface layer has an increased silicon content relative to the continuum layer.

55. The coated part of claim 53 wherein the part is a turbine part.

56. The coated part of claim 53 wherein the slurry comprises chromium metal powder.

57. The coated part of claim 56 wherein the slurry further comprises at least one of tantalum powder and titanium powder.

58. The coated part of claim 53 wherein the slurry comprises at least one of tantalum powder and titanium powder.

59. The coated part of claim 53 wherein the silicide-forming metal is selected from the group consisting of chromium, tantalum, and titanium.

60. The coated part of claim 53 wherein the silicide-forming metal is selected from the group consisting of rhenium, zirconium, hafnium, and manganese.

61. The coated part of claim 53 wherein the silicide-forming metal is selected from the group consisting of elements of Group 4b and 5b of the Periodic Table.

* * * * *

UNITED STATES PATENT AND TRADEMARK OFFICE

CERTIFICATE OF CORRECTION

PATENT NO. : 5,795,659

DATED : August 18, 1998

INVENTOR(S) : Mehar C. Meelu, Alan T. Jones, and Bruce G. McMordie

It is certified that error appears in the above-identified patent and that said Letters Patent is hereby corrected as shown below:

On the title page;
Line 73 should read Assignees: Sermatech International Inc., Limerick, Pa.
Rolls-Royce, Inc., plc., Derby, England;
a part interest Signed and Sealed this Twelfth Day of January, 1999

*Attest:*

*Attesting Officer*

*Acting Commissioner of Patents and Trademarks*